US012492102B2

(12) United States Patent
Eberharter et al.

(10) Patent No.: US 12,492,102 B2
(45) Date of Patent: Dec. 9, 2025

(54) METHOD FOR CONTROLLING A MOVEMENT OF A LOAD IN A WORKSPACE OF A LOAD TRANSPORT DEVICE

(71) Applicant: Hans Künz GmbH, Hard (AT)

(72) Inventors: Johannes Karl Eberharter, Hard (AT); Robert Lang, Innsbruck (AT); Georg Klapper, Hard (AT)

(73) Assignee: Hans Künz GmbH, Hard (AT)

( * ) Notice: Subject to any disclaimer, the term of this patent is extended or adjusted under 35 U.S.C. 154(b) by 460 days.

(21) Appl. No.: 18/075,730

(22) Filed: Dec. 6, 2022

(65) Prior Publication Data
US 2023/0174349 A1 Jun. 8, 2023

(30) Foreign Application Priority Data

Dec. 6, 2021 (AT) .................................. A192/2021

(51) Int. Cl.
*B66C 7/12* (2006.01)
*B66C 13/06* (2006.01)
(Continued)

(52) U.S. Cl.
CPC .............. *B66C 7/12* (2013.01); *B66C 13/063* (2013.01); *B66C 13/085* (2013.01); *B66C 21/02* (2013.01)

(58) Field of Classification Search
CPC ....... B66C 7/12; B66C 13/063; B66C 13/085; B66C 21/02; B66C 21/00; B66C 13/22;
(Continued)

(56) References Cited

U.S. PATENT DOCUMENTS 10,369,693 B1   8/2019 Levine et al.
2005/0224438 A1* 10/2005 Maurer ................. B66C 13/063
                                                  212/274
(Continued)

FOREIGN PATENT DOCUMENTS

DE   102009050729      4/2011
DE   102009050729 A1 * 4/2011 ............ B25J 9/0078
KR   20120057185      6/2012

OTHER PUBLICATIONS

Etienne Picard, Elias Tahoumi, Franck Plestan, Stephane Caro, Fabien Claveau. A new control scheme of cable-driven parallel robot balancing between sliding mode and linear feedback. The 21st IFAC World Congress (IFAC 2020), Berlin, Germany, Jul. 2020.
(Continued)

*Primary Examiner* — Khoi H Tran
*Assistant Examiner* — Tristan J Greiner
(74) *Attorney, Agent, or Firm* — Volpe Koenig

(57) ABSTRACT

A method for controlling a movement of a load in a workspace by a control device, including a) acquiring target coordinates to be set of a target point in the workspace towards which a load pick-up apparatus is to be moved, b) determining a load measured value by measuring the weight of the load using a load measuring device, c) determining actual cable lengths of positioning cables, d) determining desired cable lengths to be set by the respective positioning cable winch, for the positioning cables for the target coordinates of the target point to be set and for the current load measured value, and for each of the positioning cables, the control device searches a database for a data set that matches the target coordinates of the target point that are to be set and the current load measured value, and determines the desired cable length to be set.

10 Claims, 9 Drawing Sheets

(51) Int. Cl.
*B66C 13/08* (2006.01)
*B66C 21/02* (2006.01)

(58) Field of Classification Search
CPC . B25J 9/0078; B66F 7/02; B66D 1/12; B66D 1/28; B66D 1/30; B66D 1/40; B66D 1/54
See application file for complete search history.

(56) References Cited

U.S. PATENT DOCUMENTS

| | | | | |
|---|---|---|---|---|
| 2013/0245816 | A1* | 9/2013 | Langer | B66C 13/02 700/228 |
| 2017/0322561 | A1* | 11/2017 | Stiernagle | G06Q 10/0875 |
| 2018/0231100 | A1* | 8/2018 | Khajepour | F16F 15/02 |
| 2018/0272535 | A1* | 9/2018 | Ogawa | B25J 13/085 |

OTHER PUBLICATIONS

Austrian Search Report dated Nov. 11, 2022 for Austrian Patent Application No. A 192/2021.
Picard et al., "Pulleys and Force Sensors Influence on Payload Estimation of Cable-Driven Parallel Robots," 2018 IEEE/RSJ International Conference on Intelligent Robots and Systems (IROS), Madrid, Spain, pp. 1429-1436 (2018).
Merlet, "The kinematics of cable-driven parallel robots with sagging cables: preliminary results," 2015 IEEE International Conference on Robotics and Automation (ICRA), Seattle, WA, USA, pp. 1593-1598 (2015).
Santos et al., "Model Predictive Control of Large-Dimension Cable-Driven Parallel Robots." In: Pott, A., Bruckmann, T. (eds) Cable-Driven Parallel Robots. CableCon 2019. Mechanisms and Machine Science, vol. 74. Springer, Cham. (2019).
Irt Jules Verne—Advanced Technologies for Industry, 5 pages, undated prior art (Jan. 2020).
Gagliardini et al., "Optimal Design of Cable-Driven Parallel Robots for Large Industrial Structures." Proceedings—IEEE International Conference on Robotics and Automation (2014).
"Spiderbot_Cable_robot", http://www.hizook.com/files/users/3/Spiderbot_Cable_robot_Peters_1.jpg Available at: https://web.archive.org/web/20140820002809/http://www.hizook.com/files/users/3/Spiderbot_Cable_robot_Peters_1.jpg (2014).
"Cable Driven Parallel Robot 3d Simulator—2nd configuration" Available at: https://www.youtube.com/watch?v=f_6GUW8ARss (2013).
http://www-sop.inria.fr/members/Laurent.Blanchet/images/WDPR2.png, undated prior art (2013).
Four Cable Robot Test, https://www.youtube.com/watch?v=iwumk1zXYaQ (2013).
Cable driven robot Final test "Gyroto", https://www.youtube.com/watch?v=s3CrOzMtJXg (2016).
Rad Tolerant Handling Equipment, TensileTruss Technology, https://www.par.com/capabilities/cranes-nuclear-equipment/rad-tolerant-handling-equipment/tensiletruss-technology/, Available at: https://web.archive.org/web/20220908205357/https://www.par.com/capabilities/cranes-nuclear-equipment/rad-tolerant-handling-equipment/tensiletruss-technology/ (Sep. 8, 2022).
On Site Robotics—Big Scale Sustainable 3D Printing, https://www.youtube.com/watch?v=a8YOzYTYst4 (2017).
Cable robot CoGiRo and Yaskawa SIA20F: Path Following—ANR project DexterWide, https://www.youtube.com/watch?v=g0_OqK-ZWdU (2019).
Cranebot: the flexible robotic crane, https://www.youtube.com/watch?v=oyOPtbtUWyM&feature=youtu.be (2020).
Cable Suspended Robot, https://www.youtube.com/watch?v=4RIKQsfrcdA (2017).
CoGiRo: A large-dimension cable-driven parallel robot, https://www.youtube.com/watch?v=2b4YwFZhtIE (2012).
Cranebot: the flexible robotic crane, https://www.youtube.com/watch?v=oyOPtbtUWyM (2020).

* cited by examiner

METHOD FOR CONTROLLING A MOVEMENT OF A LOAD IN A WORKSPACE OF A LOAD TRANSPORT DEVICE

INCORPORATION BY REFERENCE

The following documents are incorporated herein by reference as if fully set forth: Austrian Patent application No A 192/2021, filed Dec. 6, 2021.

TECHNICAL FIELD

The present invention relates to a method for controlling a movement of a load in a workspace of a load transport device by means of a control device of the load transport device, wherein the load transport device has a load carrier and at least one load pick-up apparatus for picking up the load, and at least three positioning cables, and at least three suspension apparatuses arranged at a distance from one another, wherein each suspension apparatus has at least one positioning cable winch for winding and unwinding one of the positioning cables, and the load carrier is suspended from the suspension apparatuses by means of the positioning cables, wherein the load carrier and the load pick-up apparatus fastened thereto are displaceable in and/or over the workspace by actuation of the positioning cable winches, wherein the method comprises the steps:
  acquiring target coordinates that are currently to be set of a target point in the workspace towards which the load pick-up apparatus is to be moved;
  determining a load measured value by measuring the weight of the load picked up at the load pick-up apparatus by means of a load measuring device of the load transport device;
  determining the actual cable lengths of the positioning cables;
  determining the desired cable lengths, which are to be set by the respective positioning cable winch by winding or unwinding, for the positioning cables for the target coordinates of the target point that are currently to be set and for the current load measured value;
  adapting the actual cable lengths of the respective positioning cables to the desired cable lengths to be set for the respective positioning cables, by actuating the respective positioning cable winch by means of a cable length adjustment of the control device and winding or unwinding the respective positioning cables.

BACKGROUND

In load transport devices of the type mentioned at the beginning, the load carrier is suspended by means of positioning cables from suspension apparatuses which are arranged in a spatially distributed manner and at a distance from one another. By correspondingly winding and unwinding the positioning cables on the respective positioning cable winches, the load carrier can be moved to and fro in the workspace between the suspension apparatuses, in order thus to enable loads suspended from the load pick-up apparatus and thus from the load carrier to be transported in the region between the suspension apparatuses from one location to another location.

An example of a load transport device is disclosed in DE 10 2009 050 729 A1. A load-bearing platform with a rectangular outline is provided therein as the load carrier. The positioning cables are fastened to each of the corners of this platform. The load transport device further comprises a computer system having a controlling unit for actuating the positioning cable winches. By means of sensors, the actual cable lengths of the positioning cables are determined and supplied to a control unit, which is connected to the controlling unit. The control unit evaluates the measured actual cable lengths and compares them with desired values of the cable length of the positioning cables, wherein deviations between the desired and actual values of the cable lengths are compensated for.

With regard to the prior art, reference is also made to the following scientific work: Document P1: Etienne Picard, Elias Tahoumi, Franck Plestan, Stéphane Caro, Fabien Claveau. *A new control scheme of cable-driven parallel robot balancing between sliding mode and linear feedback.* The 21st IFAC World Congress (IFAC 2020), July 2020, Berlin, Germany.

Document P1 discloses an experimental load transport device for handling steel plates of different shapes and masses, in which a method of the type mentioned at the beginning is carried out. The load transport device comprises cable force sensors, arranged at the cable anchoring points of a platform, for determining the weight of the steel plate picked up at the load pick-up apparatus. The scientific work studies the dynamics when following a predefined trajectory of the load carrier, wherein computationally intensive real-time calculations of the desired cable lengths to be set for the positioning cables are carried out in different control concepts. The main focus of the approaches shown in this document is to determine the dynamics and repeat accuracy of the following of the trajectory with the load pick-up apparatus with different weights. A simplified cable model is stored in the control device, which model calculates the positioning cables as straight cable portions and considers an inelastic behavior of the positioning cables.

The determination of valid solutions for the desired cable lengths to be set for the positioning cables is complex owing to geometric conditions that are to be taken into consideration, or the kinematics of the load transport device, because, owing to the redundancy of the static system that is generally present, a plurality of solutions for the desired cable lengths that are to be set are determined and then have to be reduced to a plausible solution in real time by means of the control device.

SUMMARY

The object of the invention is to provide an improved method of the type mentioned at the beginning, in which the computational outlay in the control device is reduced and the desired cable lengths that are to be set are reliably determined.

This is made possible according to the invention by a method having one or more of the features described herein.

In the method according to the invention it is provided that the control device has a database in which a large number of data sets are stored, wherein there is stored in each data set a precalculated desired cable length for in each case one of the positioning cables for predefined target coordinates of a predefined target point and for a predefined load value, and the desired cable lengths to be set for the positioning cables by the respective positioning cable winch are determined by the control device by means of a query to the database, in that, for each of the positioning cables, the control device searches the database for at least one data set that matches the target coordinates of the target point that are currently to be set and the current load measured value, and the desired cable length to be set for the respective positioning cable is determined on the basis of the precalculated desired cable length of the at least one matching data set.

The basic idea of the invention thus lies in precalculating the desired cable lengths of the positioning cables for a large number of predefined, in particular assumed, target points and predefined, in particular assumed, load values and storing these precalculated desired cable lengths, together with the associated target coordinates and the associated load values, as data sets in a database of the control device. In other words, the results of a large number of target point and load value scenarios for operation of the load transport device, expressed by the corresponding precalculated desired cable lengths, are stored in the database of the control device. The desired cable lengths to be set for the positioning cables by winding and unwinding are determined by the control device by means of a query to the database, that is to say by looking up values of desired cable lengths which have already been precalculated.

By means of the method according to the invention it is possible to dispense with a computationally intensive real-time calculation in the control device of the desired cable lengths to be set for the positioning cables. Because the database contains for each of the positioning cables precisely one data set with precisely one precalculated desired cable length for a set of predefined target coordinates of a predefined target point and a defined load value, the desired cable lengths to be set for the positioning cables can be determined by the method according to the invention in a simple, rapid and reliable manner. In particular, it is possible by means of the method according to the invention to dispense with the storing of boundary conditions, quality criteria, plausibility checks, etc. in the control device, so that the control device can be configured to be less complex and to have lower computing power.

By controlling the movement of the load by the method according to the invention it is possible in a simple manner to react to changed load measured values. In particular when picking up the load from the ground, the cable forces in the positioning cables increase rapidly until the load has been lifted above the ground, so that, depending on the position of the load in the workspace, changed distributions of the desired cable lengths to be set for the positioning cables must be set in order to prevent the load from tilting or swaying at the moment when the load is lifted completely off the ground. Furthermore, in applications in which bulk material is transported by means of the load pick-up apparatus, for example when the load pick-up apparatus comprises a bulk material grab in the form of a clamshell grab, it is possible to react to load changes on loading and in particular on unloading of the bulk material by continuously adapting the actual cable lengths to the desired cable lengths to be set for the positioning cables and thus to prevent the load pick-up apparatus from swaying. It can thereby be ensured that the load, in particular the bulk material, can be loaded or unloaded from the load pick-up apparatus at the destination location. Any obstacles and/or the topography of the ground can also be taken into consideration in the cable length adjustment with the method according to the invention.

The expression predefined target coordinates of predefined target points means the coordinates of discrete, assumed points in the workspace. These points can be determined, for example, by an algorithm by dividing the space, in a manner that can be predefined in terms of its granularity or step size, into discrete sections. The expression predefined load values means load values which vary between a lowest value, for example with no load (=0 kilogram), up to a maximum value of the load. The step sizes between the lowest value and the maximum value can be defined according to the concrete requirements of the load transport device and correspondingly stored in the database.

The workspace is the space between the suspension apparatuses, in which the load fastened to the load pick-up apparatus or picked up by the load pick-up apparatus can be transported by the load transport device from one location to another location. That is to say, the target coordinates, stored in the database, of predefined target points described by locations in the workspace to which the load pick-up apparatus is able to travel.

The term cable is to be interpreted generally. It is an elongate, flexible, in particular non-rigid, element which can withstand tensile forces and can be wound on a winch. The cable can in each case be a cable in the narrower sense, for example a steel cable, but also a belt or a chain or the like. For the sake of linguistic simplification, all this is subsumed under the term cable. This applies both to the positioning cables and to further cables of the load transport device, for example the hoist cable mentioned hereinbelow.

Each cable can be in the form of a single cable. Accordingly, for the most part, the singular is also used herein for the cable. However, each cable, referred to in the singular for the sake of linguistic simplification, can of course also be implemented by a plurality of cables, in particular running parallel to one another, or by a cable bundle or by a cable that is reeved in the manner of a block and tackle.

The load carrier is the part on which the positioning cables engage in each case with their end remote from the respective suspension apparatus. The load carrier is thus suspended from the suspension apparatuses by means of the positioning cables. By actuation of the positioning cable winches, that is to say in other words by correspondingly winding or unwinding the respective positioning cable onto or from the respective positioning cable winch, the load carrier can be displaced in or over the workspace. It is hereby clear that in most cases it is necessary to wind or unwind all the positioning cables in order to move the load carrier.

The load pick-up apparatus is the part of the load transport device which serves to fasten the load to the load carrier. It can be, for example, a hook or a mechanical or magnetic grab, a bucket, a steel scoop bucket, a bulk material grab, for example a clamshell or multi-tine grab, or the like, according to the type of load to be transported by means of the load transport device. Virtually all the load pick-up apparatuses which are known in the prior art and are suitable for the particular field of use could be used for implementing the invention.

The load transport device could also be referred to as a cable robot.

The load transport device has at least three positioning cables and accordingly also at least three suspension apparatuses arranged at a distance from one another. In other embodiment variants, it is also possible that the load transport device has more than three positioning cables, that is to say, for example, four, five or six positioning cables or more, and a corresponding number of suspension apparatuses. The suspension apparatuses are advantageously but not necessarily positioned at distances from one another that are as equal as possible, for example such that, when seen from above, they are each arranged in a corner of a closed polygonal chain.

The suspension apparatuses are the apparatuses from which in each case at least one of the positioning cables is suspended. In order to form the suspension apparatuses, possible suspension means that are already present in the premises or in the region in which the load transport device is to operate can be used. For example, in the case of buildings these can be already existing walls, or in the case of a natural topography they can be rock faces, rock projections or other points, preferably points which are elevated with respect to the surroundings. It can, however, also be provided that at least one, preferably all, of the suspension apparatuses has or have at least one mast or tower, wherein the positioning cable winch and/or a diverting sheave for the positioning cable suspended from the respective suspension apparatus is arranged on the mast or tower. It is thereby possible to arrange the positioning cable winch at an elevated point or even at the highest point of the mast or tower. In this case, diverting sheaves for the respective positioning cable on the respective suspension apparatus can optionally be dispensed with. It is, however, also possible to arrange the positioning cable winch further down, in particular on the respective suspension apparatus. It is then generally advantageous if the positioning cable is guided by way of a diverting sheave of the suspension apparatus, which is arranged on the respective suspension apparatus above the positioning cable winch.

The term control device is to be interpreted broadly and includes in terms of hardware, for example, programmable logic controllers or industrial computers, which are also referred to as industrial PCs, or also other computers and combinations thereof. The expression controlling the movement of the load can include adjusting operations, such as, for example, adjusting the cable lengths of the positioning cables in the case of a deviation of the actual cable length from the desired cable length. On the other hand, the control device can also carry out control operations, such as, for example, the direct actuation of the positioning cable winches or other actuators of the load transport device. All these operations, regardless of whether they are control in the narrower sense or an adjustment, are carried out in this specification by means of the control device of the load transport device.

The acquisition of target coordinates that are currently to be set of a target point in the workspace towards which the load pick-up apparatus is to be moved can be carried out, for example, by the direct inputting of desired target coordinates, for example by means of an input device, such as, for example, by means of a keyboard.

In a preferred embodiment it is provided that the target coordinates that are currently to be set are calculated by means of a target coordinate conversion unit of the control device from a prescribed velocity vector outputted by a movement prescribing device of the load transport device. For example, the movement prescribing device can be an input unit, in particular a joystick or the like. The prescribed velocity vector outputted by the input unit is then converted in the target coordinate conversion unit into the current target coordinates that are to be set. The conversion of prescribed velocity vectors into target coordinates is known in principle. Additionally or alternatively to inputting by means of an input unit, it is also conceivable and possible that the movement prescribing device or an additional movement prescribing device is a path planning interface for precalculating the desired trajectories, that is to say the trajectory of the load pick-up apparatus or of the load. Such path planning interfaces are known in principle. For example, planning data which contain target points to be processed and/or work orders of the load transport device can be fed to the path planning interface.

The determination of the load measured value by measuring the weight of the load picked up at the load pick-up apparatus can be carried out directly with a load measuring device which is arranged on the load pick-up apparatus and outputs the load measured value to the control device. Such load measuring devices, for example in the form of load cells and/or load pins, are well known. Alternatively, the weight can be measured indirectly, for example by measuring the cable forces in the positioning cables by means of the load measuring device. Such devices are also known in the prior art.

The expressions actual cable length and desired cable length of the respective positioning cable mean a length value of the respective positioning cable which is used for determining the actual position or the desired position of the load carrier and of the load pick-up apparatus. It can be the length of the respective positioning cable unwound from the respective positioning cable winch up to an anchoring point on the load carrier or, if the respective positioning cable winch is arranged in a lower region of the suspension apparatus and the respective positioning cable is guided by way of the mentioned diverting sheave, the length of the respective positioning cable between the diverting sheave and the anchoring point on the load carrier.

The actual cable length of the respective positioning cable can be determined, for example, by an absolute encoder which is arranged directly on the positioning cable winch or by an absolute encoder which is arranged on a positioning cable winch drive which drives the positioning cable winch. The absolute encoder can be, for example, an absolute rotary encoder. By detecting the number of revolutions of the positioning cable winch, it is possible to back-calculate the length of the portion unwound from the positioning cable winch or the length of the portion of the respective positioning cable that extends between the diverting sheave and the load carrier.

The data sets stored in the database can be stored, for example, in the form of a data file. On the other hand, the data sets could be in the form of a table in the manner of a relational data bank. That is to say, the database can generally be a data bank. It is further conceivable and possible that the data sets stored in the database are stored in indexed form, for example by means of a so-called hash table, in order to facilitate or accelerate the findability of data sets that are to be queried in the large amount of data.

As already stated, a respective one of the data sets relates to in each case one of the positioning cables, wherein the precalculated desired cable length for a predefined target coordinate of a predefined target point and for a predefined load value is stored. The control device searches the database for at least one matching data set for the target coordinates of the target point that are currently to be set and for the current load measured value. If the actual cable length of one of the positioning cables differs from the desired cable length that is to be set for the positioning cable, the respective positioning cable winch is actuated by means of the cable length adjustment.

It could, for example, be provided that precisely one matching closest data set is searched for in the database, for example the data set with the closest predefined load value that is closest in terms of the predefined target coordinates, wherein the precalculated desired cable length of this data set is then used directly as the desired cable length to be set for the respective positioning cable.

It is particularly preferred if, for each of the positioning cables, the control device searches the database for at least two data sets that are closest to the target coordinates of the target point that are currently to be set and to the current load measured value, and the desired cable length to be set for the respective positioning cable is determined on the basis of the precalculated desired cable lengths of the at least two closest data sets by interpolation. By means of the interpolation, the desired cable length to be set for the respective positioning cable can be determined approximately from the discrete precalculated desired cable lengths stored in the data sets. The positioning accuracy of the load pick-up apparatus or of the load can thereby be increased.

In a simple case, the interpolation can be a linear interpolation based on the two closest matching data sets. It is, however, also conceivable and possible that a trilinear interpolation, that is to say in three-dimensional space, or an interpolation in four-dimensional space is carried out. Such interpolation methods are known in various forms. In principle, apart from linear interpolation methods in one- to multi-dimensional space, further, for example polynomial, interpolation methods are also conceivable and possible, as is well known.

Preferably, it is provided that the cable length adjustment comprises feedforward control of the desired cable length to be set for the positioning cables. By providing feedforward control, the guiding behavior of the cable length adjustment can be improved.

Preferably, it is provided that the precalculation of the precalculated desired cable lengths of the positioning cables is carried out in a data processing step of the method in a data processing device, separate from the control device, of the load transport device, wherein an indirect kinematic model of the load transport device and an optimizer are stored in the data processing device, and the indirect kinematic model and the predefined load values as well as the predefined target coordinates of the predefined target points are supplied to the optimizer, and solutions for the desired cable lengths of the positioning cables that are valid for the predefined load values at the predefined target coordinates are determined by the optimizer by means of the indirect kinematic model, and the valid solutions are stored as the precalculated desired cable lengths of the positioning cables, together with the respective associated load value and the respective associated predefined target coordinates, by the data processing device in the database of the control device as one of the data sets.

Storing of the valid solutions in the database of the control device as a data set can take place once, for example on initial operation of the load transport device. That is to say, it is possible that a data link between the data processing device and the control device of the load transport device is disconnected at least temporarily once the data sets have been stored in the database. On initial operation, the basic characteristic values of the load transport device are to be stored in the indirect kinematic model. If there is a change in basic characteristic values of the load transport device, for example as a result of changes in the position or orientation of the suspension apparatuses or a change in the own weights, etc., new data sets with precalculated desired cable lengths can be calculated on the basis of the changes in the indirect kinematic model or on the basis of the changed characteristic values of the load transport device, and these new data sets can be stored in the database of the control device as a replacement for the data sets already present.

Indirect kinematic models are known in the field of robotics. In the present case of load transport devices, the indirect kinematic model forms the computational framework which contains the physical relationships of multiple positioning cables engaging on a load carrier, which, in particular in the case of a large number of positioning cables engaging on a load carrier, lead to redundancies. In particular, the indirect kinematic model, which can also be referred to as an inverse kinematic model, reproduces the dependence of the desired cable lengths of the positioning cables on one another and in relation to the predefined target coordinates of the predefined target points and the predefined load values.

The term optimizer is understood as meaning a unit for numerically solving the indirect kinematic model. Optimizers are known in mathematics in various forms. The predefined target points, for which valid solutions for the desired cable lengths of the positioning cables at the predefined load values are determined by means of the optimizer, are discrete target points of the load transport device in the workspace to which the load pick-up apparatus can be moved during operation of the load transport device, taking into consideration the weight of the load suspended from the load pick-up apparatus.

In a preferred embodiment of the method, it is provided that, in the data processing step, the specific cable weight of the respective positioning cable is taken into consideration in the calculation of the precalculated desired cable lengths of the positioning cables in the indirect kinematic model. By taking the specific cable weight into consideration in the data processing device, the influence of the sag of the respective positioning cable due to the own weight of the cable is taken as a basis in the determination of the precalculated desired cable lengths. That is to say, by precalculating the desired cable lengths in the data processing device in the data processing step, a complex indirect kinematic model of the load transport device can be taken into consideration without affecting the computing speed of the control device itself, because the results of the precalculated desired cable lengths of the data sets also take into consideration the sag of the respective positioning cable. The indirect kinematic model could also be referred to as an extended indirect kinematic model when the specific cable weight is taken into consideration.

In order to precalculate precisely one desired cable length for the respective set of predefined target coordinates of a predefined target point and a predefined load value for each of the positioning cables, optimization conditions are generally used in the optimization.

Particularly preferably, it is provided that the data processing step is based on at least one optimization condition from:
smallest sag of the positioning cables;
smallest cable force of the positioning cables;
smallest sum of the cable forces of the positioning cables;
highest allowable cable force of the respective positioning cable;
smallest difference between the cable forces of the positioning cables;
elastic deformation of the suspension apparatuses.

For example, by taking into consideration the optimization condition of the smallest sag of the positioning cables, it is possible to prevent an unacceptable result of the indirect kinematics in which a sagging positioning cable touches the ground. A further example of a possible optimization is the principle of minimal energy on lifting the load pick-up apparatus. Such optimization conditions and also optimization conditions other than those mentioned are well known in the field of optimization calculation.

In a particularly preferred embodiment of the method it is provided that, in the data processing step, a meshing algorithm is applied, which meshes the predefined target coordinates to form a computational mesh, in particular a polygon mesh, as computational mesh data, wherein the computational mesh data comprise link data for linking adjacent predefined target coordinates of the predefined target point of the load pick-up apparatus and adjacent predefined load values, and the computational mesh data are stored in the database of the control device, and the computational mesh data are taken into consideration by the control device in the determination of the desired cable length to be set for the respective positioning cable. By providing a computational mesh, it is possible to determine more accurate results of desired cable lengths to be set for the positioning cables in the workspace, taking predefined load values into consideration. The polygon mesh can be, for example, a tetrahedral mesh.

Particularly preferably, it is provided that the data processing step comprises an iteration algorithm for compressing the computational mesh in edge regions of the workspace, wherein precalculated desired cable lengths of the positioning cables for additional coordinates of additional positions of the load pick-up apparatus are determined. By compressing the computational mesh, the number of target points in the edge regions of the workspace can be increased, in order to enlarge the workspace in the edge region and increase the accuracy of the determination of the desired cable lengths that are to be set. Such algorithms are known, for example, from the field of the finite element method.

It is particularly preferred if the iteration algorithm for compressing the computational mesh is a Delaunay triangulation.

Preferably, it is provided that the method comprises a step of acquiring design parameters for calculating the precalculated desired cable lengths of the positioning cables in the data processing step, wherein the design parameters include at least one of the following characteristic values:
- the position of cable run-off points of the suspension apparatuses, at which the respective positioning cable runs from the respective suspension apparatus in a direction towards the load carrier;
- the positions of the positioning cable winches;
- the specific cable elongation of the respective positioning cable;
- the stiffness of the respective suspension apparatus;
- the own weight of the load carrier;
- the own weight of the load pick-up apparatus;
- the center of mass of the load carrier and/or of the load pick-up apparatus.

For example, the material characteristic value of the specific cable elongation of the respective positioning cable can be stored. The stiffness of the respective suspension apparatus describes the deformation of the supports at different load values and/or target coordinates. For example, the deformation of the supports can be determined by measuring the deformation of the supports by means of a calibration load which is suspended from the load pick-up apparatus. Further design parameters can additionally be used for calculating the precalculated desired cable lengths of the positioning cables in the data processing device, for example inertias, friction values, etc., which influence the characteristics of the load transport device. The design parameters can further be geometric data of obstacles or prohibited regions in the workspace of the load transport device, for example machine parts arranged in the workspace, which interfere with the free movement of the load pick-up apparatus in the workspace.

Advantageously, all the details given hereinbefore relate to coordinates, for example the predefined target coordinates, positions, such as, for example, the position of the positioning cable winches, etc., in a reference coordinate system which is defined in relation to the load transport device.

It can be provided that the load pick-up apparatus is fixed directly to the load carrier. For example, the load pick-up apparatus could be suspended from the load carrier by a cable anchored to the load carrier or by a chain of fixed length, that is to say at a fixed distance from the load carrier. The load pick-up apparatus could also be fixed indirectly to the load carrier.

In a preferred embodiment it is provided that the load transport device has a hoist cable winch and a hoist cable, wherein the hoist cable can be wound and unwound by the hoist cable winch, and the load pick-up apparatus is suspended from the load carrier and can be lifted and lowered relative to the load carrier by means of the hoist cable.

By suspending the load pick-up apparatus from the load carrier by means of the hoist cable, and the associated possibility of lifting the load pick-up apparatus relative to the load carrier and lowering it away from the load carrier by means of the hoist cable, the workspace of the load transport device is enlarged significantly, in particular in the edge region of the workspace, compared to other forms of load transport device. The hoist cable winch can be arranged, for example, on the load carrier, wherein it can be provided for this purpose that an electric power supply line for supplying electric power to a drive motor of the hoist cable winch is integrated in at least one of the positioning cables. It is equally possible that this power supply line is guided to the hoist cable winch as a separate line. The hoist cable winch can also be supplied with power by means of a battery, which is charged or replaced outside of operating times.

Alternatively, it is conceivable and possible that the hoist cable winch is arranged on one of the suspension apparatuses. The load carrier can then have a diverting sheave, wherein the hoist cable is guided from the hoist cable winch by way of the diverting sheave to the load pick-up apparatus.

If a hoist cable is present, then the method preferably additionally comprises the following steps: determining the actual cable length of the hoist cable; determining the desired cable length of the hoist cable that is to be set by the hoist cable winch by winding or unwinding for the target coordinates that are currently to be set and for the current load measured value, wherein a precalculated desired cable length of the hoist cable is stored for the hoist cable in each data set for the predefined target coordinates of a respective one of the predefined target points and for respective ones of the predefined load values, and the desired cable length of the hoist cable that is to be set by the hoist cable winch by winding or unwinding is determined by means of a query to the database, in that the control device searches the database for at least one data set for the hoist cable that matches the target coordinates of the target point that are currently to be set and the current load measured value, and the desired cable length of the hoist cable that is to be set is determined on the basis of the precalculated desired cable length of the at least one matching data set; adapting the actual cable length of the hoist cable to the desired cable length of the hoist cable that is to be set, by actuating the hoist cable winch by means of the cable length adjustment of the control device and winding or unwinding the hoist cable. That is to say, a hoist cable that is optionally present in the load transport device can be treated analogously to the positioning cables, wherein all the method steps relating to the positioning cables can also be carried out analogously for the hoist cable or further cables.

BRIEF DESCRIPTION OF THE DRAWINGS

Further features and details of the method according to the invention and the application thereof in a load transport device will be explained by way of example in the following description of the figures, in which.

DETAILED DESCRIPTION

Figure 1:
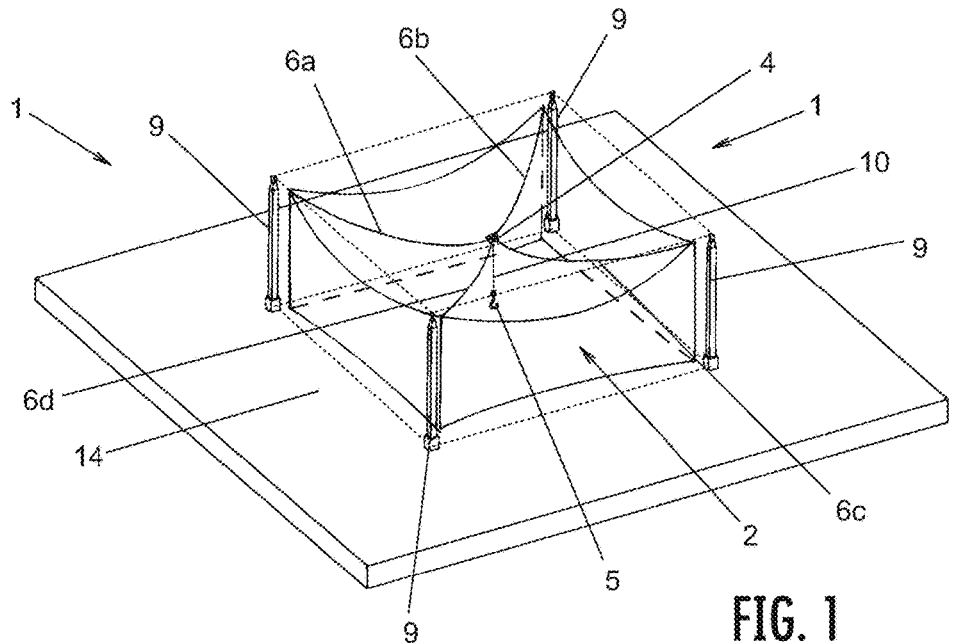
FIG. 1 is a simplified general view of a load transport device including a schematic workspace in an isometric representation.

FIG. 1 shows, in a simplified representation, a load transport device 1 having four suspension apparatuses 9 in the form of masts, from each of which a positioning cable 6a, 6b, 6c, 6d is suspended. The positioning cables 6a-d run from the respective suspension apparatus 9 to a load carrier 4, which is suspended from the suspension apparatuses 9 by means of the positioning cables 6a-d. A load pick-up apparatus 5 for picking up a load is fastened to the load carrier 4. In the representation of FIG. 1, this load pick-up apparatus 5 is in the form of a hook, wherein the load pick-up apparatus 5 is fastened to the load carrier 4 and suspended from the load carrier 4 by means of a hoist cable 10 of the load transport device 1. In the embodiment shown in FIG. 1, the load pick-up apparatus 5 can be lifted and lowered relative to the load carrier 4. By winding and unwinding the positioning cables 6a-d on the positioning cable winches 7 (not shown in FIG. 1), the load carrier 4 together with the load pick-up apparatus 5 can be moved in the region between the suspension apparatuses 9 in order to pick up loads 3, transport them to another location and set them down again on the surface of the ground 14. By providing a hoist cable 10, the region at the edges in the vicinity of the suspension apparatuses 9 can also easily be reached. The workspace 2, shown in simplified form in FIG. 1, defines the space between the suspension apparatuses 9, in which the load fastened to the load pick-up apparatus 5 or picked up by the load pick-up apparatus 5 can be transported by the load transport device 1 from one location to another location. The workspace 2 is generally smaller than the space between the suspension apparatuses 9, which is apparent from comparing the solid lines of the workspace 2 with the space spanned by the suspension apparatuses 9, which in FIG. 1 is indicated by broken lines.

The method for controlling a movement of the load 3 in the workspace 2, which will be explained hereinbelow, can be carried out, as stated at the beginning, for load transport devices 1 having only three positioning cables and accordingly also only three suspension apparatuses, but especially also having more than three, that is to say four, five or six, etc., positioning cables and suspension apparatuses. The suspension apparatuses are thereby advantageously located, when seen in a plan view of the surface of the ground 14, in the corners of a notional, closed polygonal chain, which in the case of three suspension apparatuses is simply a triangle. In the case of the four suspension apparatuses 9 shown in FIG. 1, the suspension apparatuses 9 are located, when seen in a plan view of the surface of the ground 14, in a rectangle or a square, or generally speaking in a quadrilateral. In the case of five suspension apparatuses, they are located, when seen in a plan view of the surface of the ground, in a pentagon, etc.

In FIG. 1, the load carrier 4 is shown only schematically, wherein in each case one of the positioning cables 6a to 6d engages each corner of the load carrier 4. The hoist cable winch 11 (not shown) can be arranged on the load carrier 4 or, as is implemented in the load transport device 1 shown in FIG. 2 to 4, can be arranged on one of the suspension apparatuses 9. All this is known in the prior art.

Figure 2:
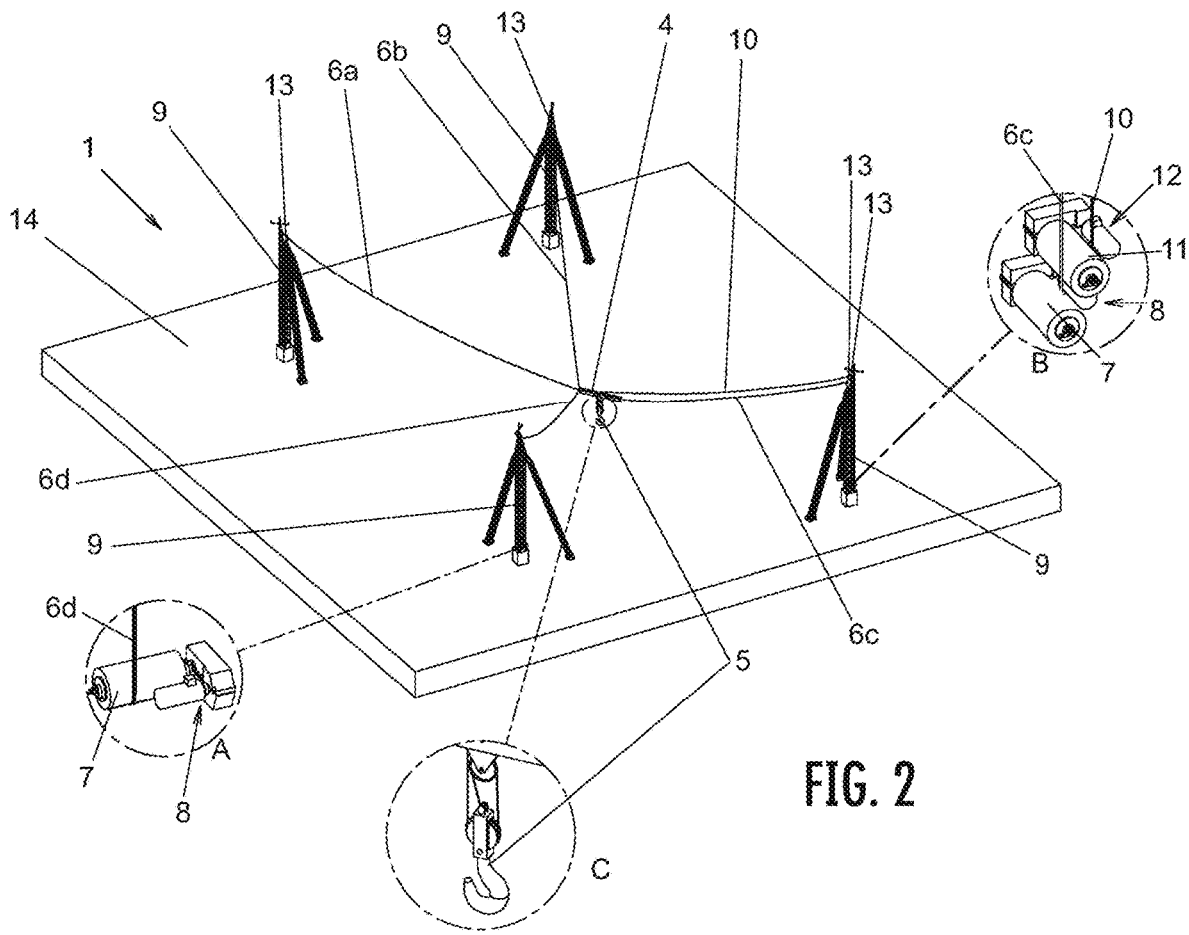
FIG. 2 is an isometric representation of a load transport device with three enlarged detail views A to C.
Figure 3:
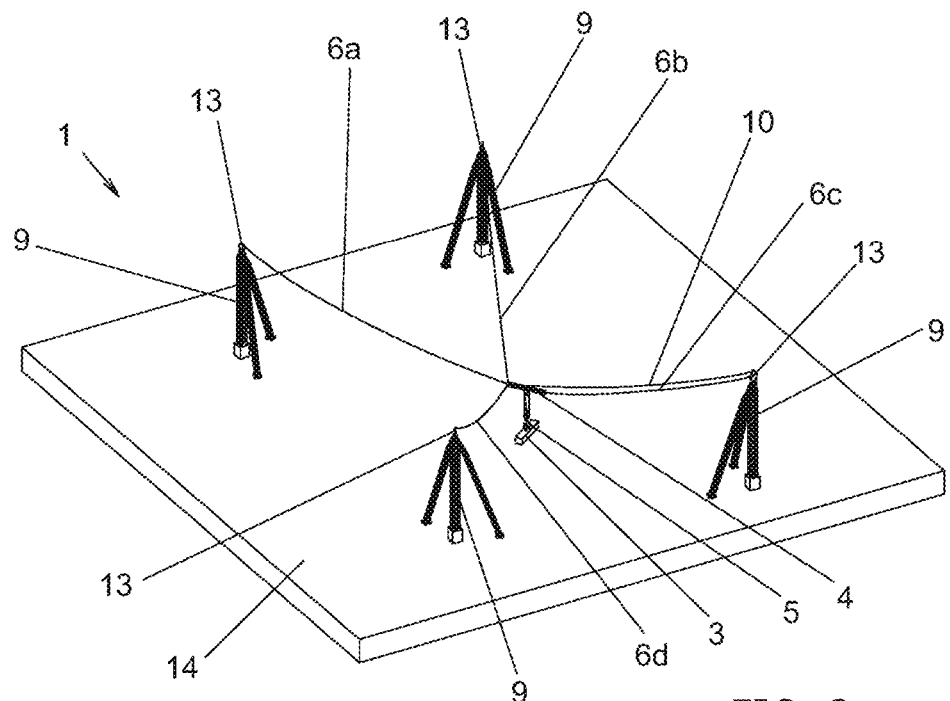
FIG. 3 shows the load transport device according to FIG. 2 when picking up a load.
Figure 4:
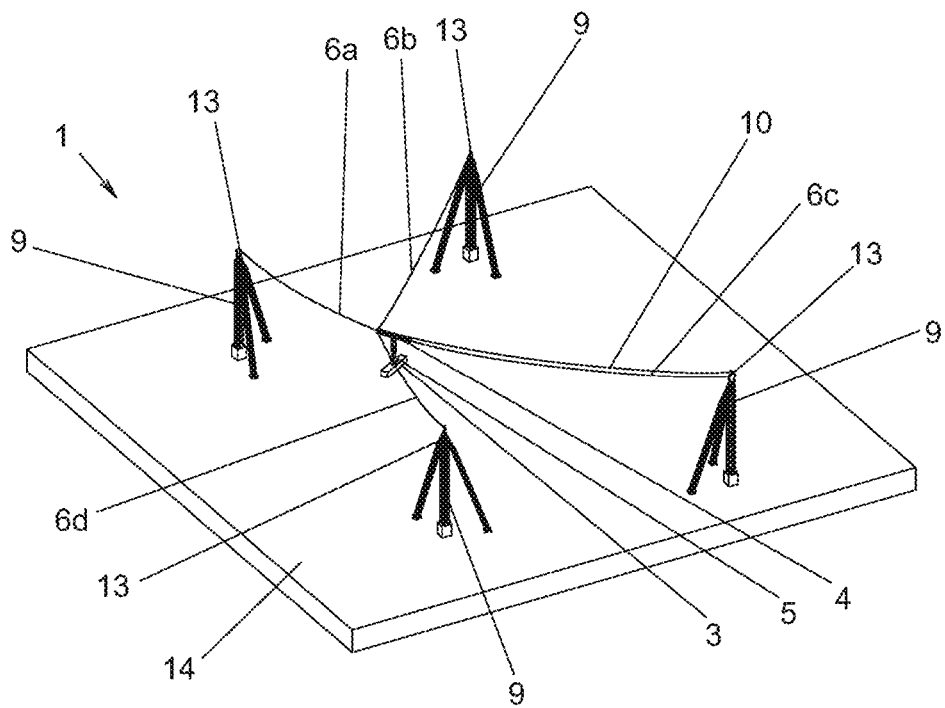
FIG. 4 shows the load transport device according to FIG. 2 when transporting the load in the workspace.

In FIG. 2 to 4, an example of a load transport device 1 is shown, with reference to which the method according to the invention will be explained. The respective suspension apparatus 9 has two compression supports (not specifically designated) and a weighted tension support, which rests on the ground 14. Each suspension apparatus 9 has a positioning cable winch 7 for winding and unwinding in each case one of the positioning cables 6a-6d. In the exemplary embodiment shown, the positioning cable winches 7 are each arranged in a region of the suspension apparatus 9 near to the floor, close to the ground 14.

In the detail representations A to C marked in each case by dot-and-dash circles, details of the load transport device 1 of FIG. 2 are emphasized. Detail A shows by way of example one of the positioning cable winches 7, which serves to wind and unwind the positioning cable 6d. Each positioning cable winch 7 has a positioning cable winch drive 8, which in the exemplary embodiment is in the form of a motor-transmission unit for driving the cable drum (not specifically designated), see also detail B.

In the load transport device 1 shown in FIG. 2 to 4, the hoist cable 10 is guided from the load carrier 4 to one of the suspension apparatuses 9, wherein a hoist cable winch 11 for winding and unwinding the hoist cable 10 is arranged in a region of the suspension apparatus 9 near to the floor, see detail B of FIG. 2. The hoist cable winch 11 has a hoist cable winch drive 12, which is in the form of a motor-transmission unit.

The load pick-up apparatus 5 is in the form of a hook, which serves to pick up the load 3, see detail C of FIG. 2. The hoist cable 10 is reeved on the load carrier 4 in the manner of a block and tackle between the hook and a cable diverting sheave (not specifically designated) and is anchored to the hook. Such block and tackle arrangements are known in various forms. Instead of a hook, the load pick-up apparatus can also be of a different form, according to the application, as has already been explained at the beginning. For the method for controlling the movement of the load 3 in the workspace 2, the form of the load pick-up device 5 is of secondary importance.

In the load transport device 1 shown in FIG. 2 to 4, the load carrier 4 is in the form of a traverse, wherein three of the positioning cables 6a, 6b and 6d engage one end of the traverse and the positioning cable 6c engages an opposite end of the traverse on the load carrier 4. The hoist cable 10 runs parallel to the positioning cable 6c to the same suspension apparatus 9.

The respective one of the positioning cables 6a-d or the hoist cable 10 runs in the region of the suspension apparatuses 9 in each case from the cable drum substantially in a vertical direction to a diverting sheave 13 located opposite the ground 14 and arranged on the suspension apparatus 9, and from the diverting sheave in each case to the load carrier 4.

In FIGS. 3 and 4, two exemplary positions of the load carrier 4, or of the load pick-up apparatus 5, and of the load 3 are shown. In the state shown in FIG. 3, the load 3 picked up by the load pick-up apparatus 5 has been lifted from the ground 14 by the load pick-up apparatus 5. FIG. 4 shows a state in which the load 3, in the state lifted from the ground 14, is transported in the workspace 2 to a destination location. Lifting of the load 3 and transporting of the load 3 in the workspace 2 is carried out by winding and unwinding the respective positioning cable 6a-d on or from the positioning cable winch 7 and/or by winding and unwinding the hoist cable 10 on or from the hoist cable winch 11. For reasons of clarity, the positioning cable winches 7 and the hoist cable winch 11 are not shown in FIGS. 3 and 4.

Figure 5:
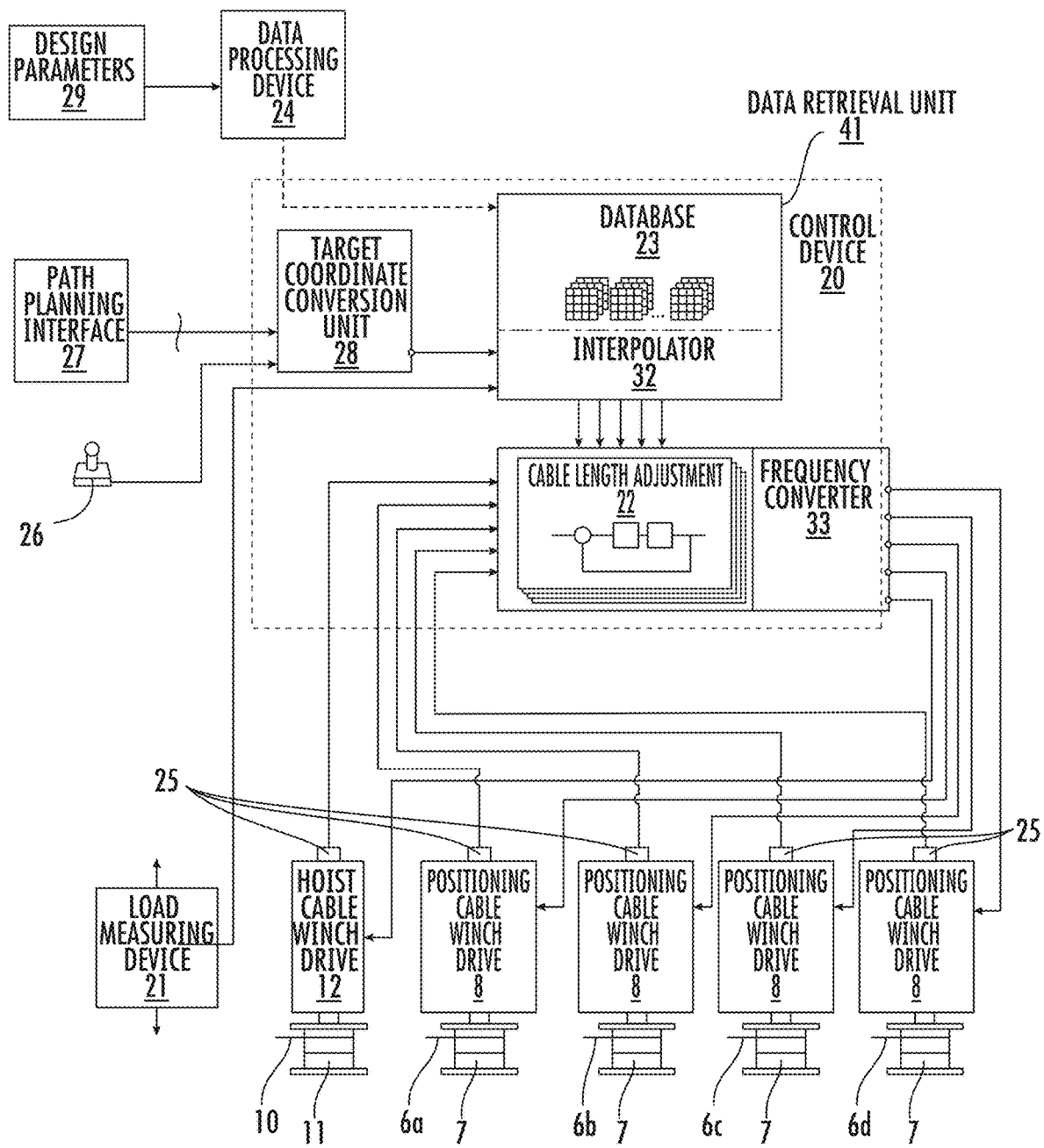
FIG. 5 is a schematic representation of the actuation of the positioning cable winches and of the hoist cable winch of the load transport device according to FIG. 2.

In FIG. 5, the components of the load transport device 1 for actuating the positioning cable winches 7 and the hoist cable winch 11 are shown in simplified form, in order to explain the method according to the invention in detail. The positioning cable winch drives 8 and the hoist cable winch drive 12 are likewise shown in simplified form. In the exemplary embodiment, each positioning cable winch drive 8 and the hoist cable winch drive 12 has an absolute encoder 25 for detecting the rotary position of the positioning cable winches 7 or of the hoist cable winch 10. By means of the absolute encoder 25, the actual cable length of the respective positioning cable 6a-d and of the hoist cable 10 that has been unwound from the respective positioning cable winch 7 or hoist cable winch 11 can be determined.

The load transport device 1 further has a control device 20, which serves to monitor and adjust the cable lengths of the positioning cables 6a-d. In the exemplary embodiment, the control device 20 is a combination of a programmable logic controller and an industrial computer. Other forms of the control device 20 are also possible, as has been mentioned at the beginning.

The values outputted by the absolute encoders 25 are converted in the control device 20 into a value of the actual cable lengths, which is not shown separately in the figures. The values of the actual cable lengths are supplied to a cable length adjustment 22, which compares the measured actual cable lengths with predefined desired cable lengths, which have yet to be explained, and, on the basis of this comparison, performs an adaptation of the actual cable lengths of the positioning cables 6a-d by winding or unwinding the positioning cables 6a-d and of the actual cable length of the hoist cable 10 by winding or unwinding.

In the exemplary embodiment, a frequency converter 33 of the load transport device 1 is connected downstream of the cable length adjustment 22 and performs the actuation of the positioning cable winch drives 8 and of the hoist cable winch drive 12. In another embodiment, the cable length adjustment 22 could be part of the frequency converter 33. Such embodiments of frequency converters are well known.

The load transport device 1 further has a load measuring device 21, which is likewise shown only schematically in FIG. 5. In the exemplary embodiment, the load measuring device 21 is arranged on the load pick-up apparatus 5 and allows the weight of the load 3 picked up at the load pick-up apparatus 5 to be measured.

The control device 20 has a data retrieval unit 41 to which the load measured value outputted by the load measuring device 21 is supplied.

The load transport device 1 further has two movement prescribing devices. One movement prescribing device, referred to as an input device 26, serves to acquire movement directions of the load pick-up apparatus 5 that are currently to be set. In FIG. 5, the input device 26 is depicted as a joystick, which can be operated by an operator of the load transport device 1 in order to prescribe movement commands directly. A prescribed velocity vector outputted by the input device 26 is converted in a target coordinate conversion unit 28 of the control device 20 into the target coordinates that are currently to be set of a target point towards which the load pick-up apparatus 5 is to be moved. Such target coordinate conversion units 28 are well known.

In the exemplary embodiment, the other movement prescribing device of the load transport device 1 is a path planning interface 27, which is likewise shown only schematically in FIG. 5. In the exemplary embodiment, the prescribed data outputted by the path planning interface 27 are likewise in the form of a prescribed velocity vector and are supplied to the target coordinate conversion unit 28, which converts the prescribed velocity vector into the target coordinates that are currently to be set of a target point towards which the load pick-up apparatus 5 is to be moved. It would also be conceivable and possible that the path planning interface 27 prescribes further prescribed data in addition to velocity vectors, such as, for example, acceleration values, jerk values, etc. In this case too, the target coordinate conversion unit 28 uses the data provided by the path planning interface 27 to determine the target coordinates that are currently to be set of the target point towards which the load pick-up apparatus 5 is to be moved.

The path planning interface 27 can be arranged remote from the control device 20, which is shown in FIG. 5 by a break symbol in the connecting line between the path planning interface 27 and the target coordinate conversion unit 28. The path planning interface 27 can, for example, be linked to path planning software of a central computer which is used for planning the work sequences of the load pick-up apparatus 5 in the workspace 2, which is not shown separately. With the path planning software, prescriptions can be made in respect of a planned movement path of the load pick-up apparatus and/or the change in the velocity and/or the acceleration and/or the jerk of the load pick-up apparatus relative to the movement path. Such central computers and corresponding path planning software are well known.

The control device 20 has a database 23 arranged in the data retrieval unit 41 of the control device 20. A large number of data sets are stored in the database 23.

Each data set stored in the database 23 contains for in each case one of the positioning cables 6a-d, and in the exemplary embodiment also for the hoist cable 10, a precalculated desired cable length of the respective positioning cable 6a-d and of the hoist cable 10 for predefined target coordinates of a predefined target point and a predefined load value.

The predefined target coordinates relate to a reference coordinate system which is fixed in relation to the load transport device 1. By means of the reference coordinate system, all the points in the workspace 2 can explicitly be described.

The method for controlling a movement of the load 3 in the workspace 2 of the load transport device 1 by means of the control device 20 comprises a sequence of steps:

In a first step, the target coordinates that are currently to be set of a target point in the workspace 2 towards which the load pick-up apparatus 5 is to be moved are acquired. In the exemplary embodiment, this step is carried out by means of the target coordinate conversion unit 28, which transmits the target coordinates to the data retrieval unit 41.

A load measured value is further determined by measuring the weight of the load 3 picked up at the load pick-up apparatus 5 by means of the load measuring device 21. The load measuring device 21 can be arranged directly on the load pick-up apparatus 5, for example on the hook, as is known per se. Alternatively, the determination of the load measured value can be carried out indirectly by a load measuring device 21 arranged on the hoist cable winch 11, for example by means of one or more load pins at an anchorage of the hoist cable winch 11, or by measuring the required torque of the hoist cable winch 11. Such forms of load measuring devices 21 are also well known. The cable length of the hoist cable 10 unwound from the hoist cable winch 11 can optionally be taken into consideration in the determination of the load measured value. Furthermore, indirect measurement of the weight of the load 3 can be carried out by means of the load measuring device 21 by determining the cable forces in the positioning cables 6a-6d, preferably taking into consideration the cable length unwound from the respective positioning cable winch 7. If the hoist cable winch 11, as provided in the exemplary embodiment, is arranged on one of the suspension apparatuses 9, indirect measurement of the weight of the load 3 can be carried out by means of the load measuring device 21 by measuring the cable forces of the positioning cables 6a-6d and by measuring the cable force of the hoist cable 10, taking into consideration the cable length unwound from the respective positioning cable winch 7 or from the hoist cable winch 11.

The determination of the current position of the load pick-up apparatus 5 in the workspace 2 is carried out by determining the actual cable lengths of the positioning cables 6a-d, and in the exemplary embodiment also by determining the actual cable length of the hoist cable 10.

The desired cable lengths to be set for the positioning cables 6a-d and for the hoist cable 10 are determined by the control device 20 by means of a query to the database 23. To that end, for each of the positioning cables 6a-d and the hoist cable 10, the control device 20 searches the database 23 for at least one data set that matches the target coordinates currently to be set for the target point and for the current load measured value. The desired cable length to be set for the respective positioning cable 6a-d and for the hoist cable 10 is further determined on the basis of the precalculated desired cable length of the at least one matching data set. The determination of the desired cable length to be set, and possible ways of improving the accuracy of the desired cable length to be set, will be discussed further hereinbelow.

Furthermore, the actual cable lengths of the respective positioning cables 6a-d are adapted to the desired cable lengths of the respective positioning cables 6a-d and the actual cable length of the hoist cable 10 is adapted to the desired cable length of the hoist cable 10 by actuation of the respective positioning cable winch 7 or of the hoist cable winch 11 by means of the cable length adjustment 22 of the control device 20.

As long as the load measured value and the target coordinates to be set do not change, and if the actual cable length of the respective positioning cable 6a-d and of the hoist cable 10 is different from the desired cable length to be set for the respective positioning cable 6a-d and for the hoist cable 10, the cable length adjustment 22 carries out the adaptation of the actual cable length to the desired cable length to be set for the respective positioning cable 6a-d and for the hoist cable 10 until the actual cable length of each positioning cable 6a-d and of the hoist cable corresponds to the respective desired cable lengths.

If the target coordinates to be set change owing to a changed prescribed velocity vector and/or owing to a changed load measured value, for example as a result of a load 3 being picked up or as a result of a load 3 being unloaded, new desired cable lengths to be set for the positioning cables 6a-d and for the hoist cable 10 are retrieved from the database 23 by means of the data retrieval unit 41. That is to say, the cable length adjustment 22 receives new desired cable lengths to be set for the positioning cables 6a-d and for the hoist cable 10, wherein the cable length adjustment 22 then carries out the adaptation of the actual cable length to the new desired cable lengths to be set for the respective positioning cable 6a-d and for the hoist cable 10 until the actual cable length of each positioning cable 6a-d and of the hoist cable 10 corresponds to the respective desired cable lengths to be set.

A simple example of the data sets stored in the database 23 is given hereinbelow. The designation XYZG allocates the following example values, enclosed in square brackets, to the predefined target coordinates X, Y and Z of a predefined target point and G a corresponding load value assumption, which in the example data is constantly 1. For reasons of simplicity, the values of the target coordinates in the X- and Y-direction are also constantly 1 in the example data. Only the target coordinate Z changes between the values 1, 2 and 3 in the example data:

XYZG[1,1,1,1].positioning cable[1] :=2882.0;
XYZG[1,1,1,1].positioning cable[2] :=2594.2;
XYZG[1,1,1,1].positioning cable[3] :=1136.5;
XYZG[1,1,1,1].positioning cable[4] :=1906.4;
XYZG[1,1,2,1].positioning cable[1] :=2858.9;
XYZG[1,1,2,1].positioning cable[2] :=2548.1;
XYZG[1,1,2,1].positioning cable[3] :=1039.8;
XYZG[1,1,2,1].positioning cable[4] :=1847.0;
XYZG[1,1,3,1].positioning cable[1] :=2843.5;
XYZG[1,1,3,1].positioning cable[2] :=2503.9;
XYZG[1,1,3,1].positioning cable[3] :=943.7;
XYZG[1,1,3,1].positioning cable[4] :=1789.9;

For each of the positioning cables, the allocation of which takes place by way of the number, indicated in the corresponding square brackets, of the respective positioning cable, the desired cable length to be set is precalculated and stored. For example, for positioning cable [1] in the case of the predefined target coordinates X=1, Y=1, Z=1 and the predefined load value G=1, the desired cable length to be set=2882.0.

It can be provided that the desired cable lengths to be set for the positioning cables 6a-d by the respective positioning cable winch 7 by winding or unwinding are determined by the control device 20 by means of a query to the database 23 by way of the data retrieval unit 41, in that, for each of the positioning cables 6a-d, the control device 20 searches the database 23 for a matching data set that is closest to the target coordinates of the target point that are currently to be set and to the current load measured value, and the desired cable length to be set for the respective positioning cable 6a-d is determined on the basis of the precalculated desired cable length of the one matching data set.

Returning to the examples of data sets given above, in the case of, for example, the target coordinates X=1, Y=1 and Z=2.2 and G=1 to be set for positioning cable [2], the closest data set would be searched for and thus the data set XYZG[1,1,2,1].positioning cable [2] :=2548.1;

would be found, since this corresponds to the closest data set with regard to coordinate Z, etc. If the requirements in terms of the positioning accuracy of the load pick-up apparatus 5 are low, the process can be continued directly with the found value of the precalculated desired cable length.

The values stored in the database are thus discrete predefined target coordinates on the basis of which, taking into consideration the predefined load values, the desired cable lengths to be set for the positioning cables 6a-d and also for the hoist cable 10, which has been omitted from the example data, are determined.

In the exemplary embodiment, the data retrieval unit 41 has an interpolator 42, in order to increase the positioning accuracy of the load transport device 1. In the method for controlling the movement of the load 3 in the workspace 2, to that end at least two closest data sets for the target coordinates of the target point that are currently to be set and for the current load measured value are searched for in the database 23, and the desired cable length to be set for the respective positioning cable 6a to 6d is determined on the basis of the precalculated desired cable lengths of the at least two closest data sets by interpolation. In the simplest case, the interpolation can be a linear interpolation. Other, in particular non-linear, interpolation methods can also be used in order to further improve the positioning accuracy of the load transport device 1. The interpolator 32 performs the corresponding interpolation in the data retrieval device 41. Such interpolators 32 are known per se.

Figure 6:
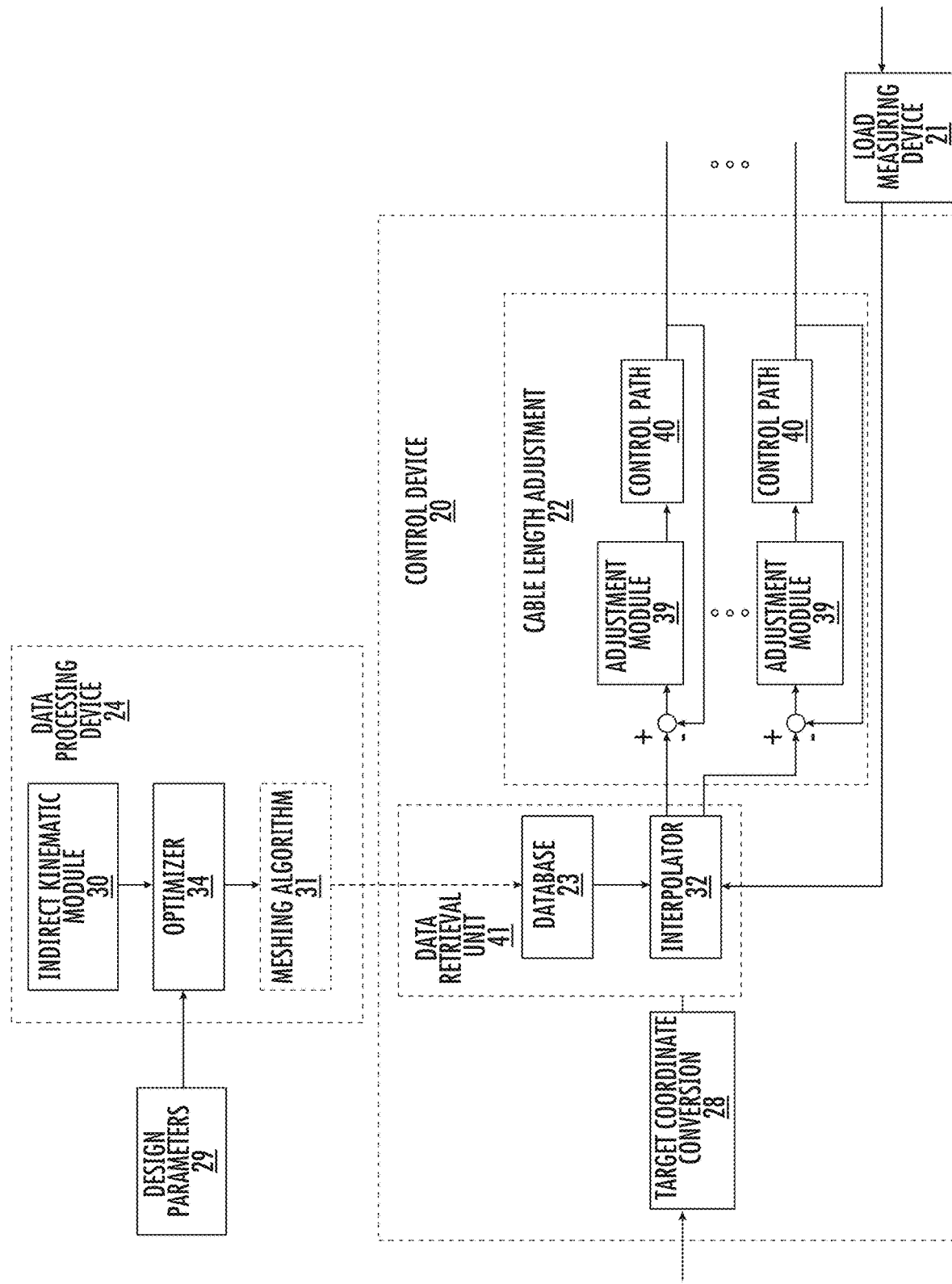
FIG. 6 is a schematic detail view of a data processing device and of a control device of the load transport device according to FIG. 2.

In FIG. 6, the cable length adjustment 22 in particular is shown in greater detail by block diagrams. In particular, it is apparent from FIG. 6 that, for each of the positioning cables 6a-d and the hoist cable 10, adjustment is carried out separately, which is indicated symbolically by the three dots which are depicted.

In the exemplary embodiment, the cable length adjustment 22 has a control module 39, which is known per se, and the control path 40 represented symbolically. As already explained, the cable length adjustment 22 matches the actual cable length of the respective positioning cable 6a-d and of the hoist cable 10 to the desired cable lengths to be set for the respective positioning cable 6a-d or for the hoist cable 10 by actuating the respective positioning cable winch 7 or the hoist cable winch 11. Actuation of the respective positioning cable winch 7 and of the hoist cable winch 11 is shown symbolically in FIG. 6 by the control path 40. Furthermore, the determination of the load measured value by measuring the weight of the load 3 picked up at the load pick-up apparatus 5 by means of the load measuring device 21 is also shown symbolically in FIG. 6. It can clearly be seen here that the load measured value is supplied to the interpolator 32 of the data retrieval unit 41, wherein the interpolator 32 determines the desired cable length to be set for the respective cable. The desired cable length to be set in each case could in this context also be referred to as the reference variable of the cable length adjustment 22.

In the exemplary embodiment, the load transport device 1 has a data processing device 24, which is separate from the control device 20. A data line (not specifically designated in the figures) between the data processing device 24 and the control device 20 is shown by a broken line in FIGS. 5 and 6. In the exemplary embodiment, the data processing device 24 serves to determine the precalculated desired cable lengths of the positioning cables 6a-d and of the hoist cable 10, which will be discussed in greater detail hereinbelow.

The data link between the control device 20 and the data processing device 24 can be maintained permanently, but this is not essential because the control device 20 is able to work independently of the data processing device 24. In particular, it is possible that the data link between the data processing device 24 and the control device 20 exists only once, for example on initial operation of the load transport device 1, or is established as required in order to import data sets into the database 23.

In the exemplary embodiment, an indirect kinematic model 30 of the load transport device 1 is stored in the data processing device 24. The indirect kinematic model 30 describes the mathematical computational framework with which, on the basis of predefined target coordinates of the predefined target points and predefined load values, the desired cable lengths of the positioning cables 6a-d are precalculated. For example, the indirect kinematic model 30 describes the physical relationships of the cable statics of the respective positioning cable etc., as has already been explained at the beginning.

In preferred embodiments, such as in the exemplary embodiment shown, the indirect kinematic model 30 takes the specific cable weight of the respective positioning cable 6a-d into consideration in the calculation of the precalculated desired cable lengths of the positioning cables 6a-d. Furthermore, it is advantageous also to take the specific cable weight into consideration in the case of the hoist cable 10. As already explained, the indirect kinematic model 30, when the specific cable weight is taken into consideration, as shown in the exemplary embodiment, could also be referred to as an extended indirect kinematic model.

There is further provided in the data processing device 24 an optimizer 34 which, taking into consideration design parameters 29, determines solutions to the indirect kinematics 30 for the desired cable lengths of the positioning cables 6a-d by the application of numerical mathematics. Such optimizers 34 are known in various forms.

The design parameters 29 for calculation of the precalculated desired cable lengths of the positioning cables 6a-d in the data processing device 24 can include at least one of the following characteristic values:

the position of cable run-off points of the suspension apparatuses 9, at which the respective positioning cable 6a-d runs from the respective suspension apparatus 9 in a direction towards the load carrier 4;

the positions of the positioning cable winches 7 and of the hoist cable winch 11;

the specific cable elongation of the respective positioning cable 6a-d.

Further characteristic values of the load transport device 1 can also be taken into consideration as design parameters, as has already been explained at the beginning.

There are further stored in the data processing device 24 optimization conditions 35 which serve to determine precisely one plausible solution for the desired cable lengths of the positioning cables 6a-d. In the exemplary embodiment, it is provided, for example, that the optimization condition takes into consideration the smallest cable force of the positioning cables 6a-d. The smallest sum of the cable forces of the positioning cables 6a-d, for example, can further be used as an optimization condition. Further examples of optimization conditions have already been explained at the beginning and could be, for example, the smallest sag of the positioning cables 6a-d. The optimization conditions 35 serve to improve the stability of the optimizer 34 and to ensure the reliability of the determination of precisely one correct solution for the desired cable lengths of the positioning cables 6a-d.

Figure 7:
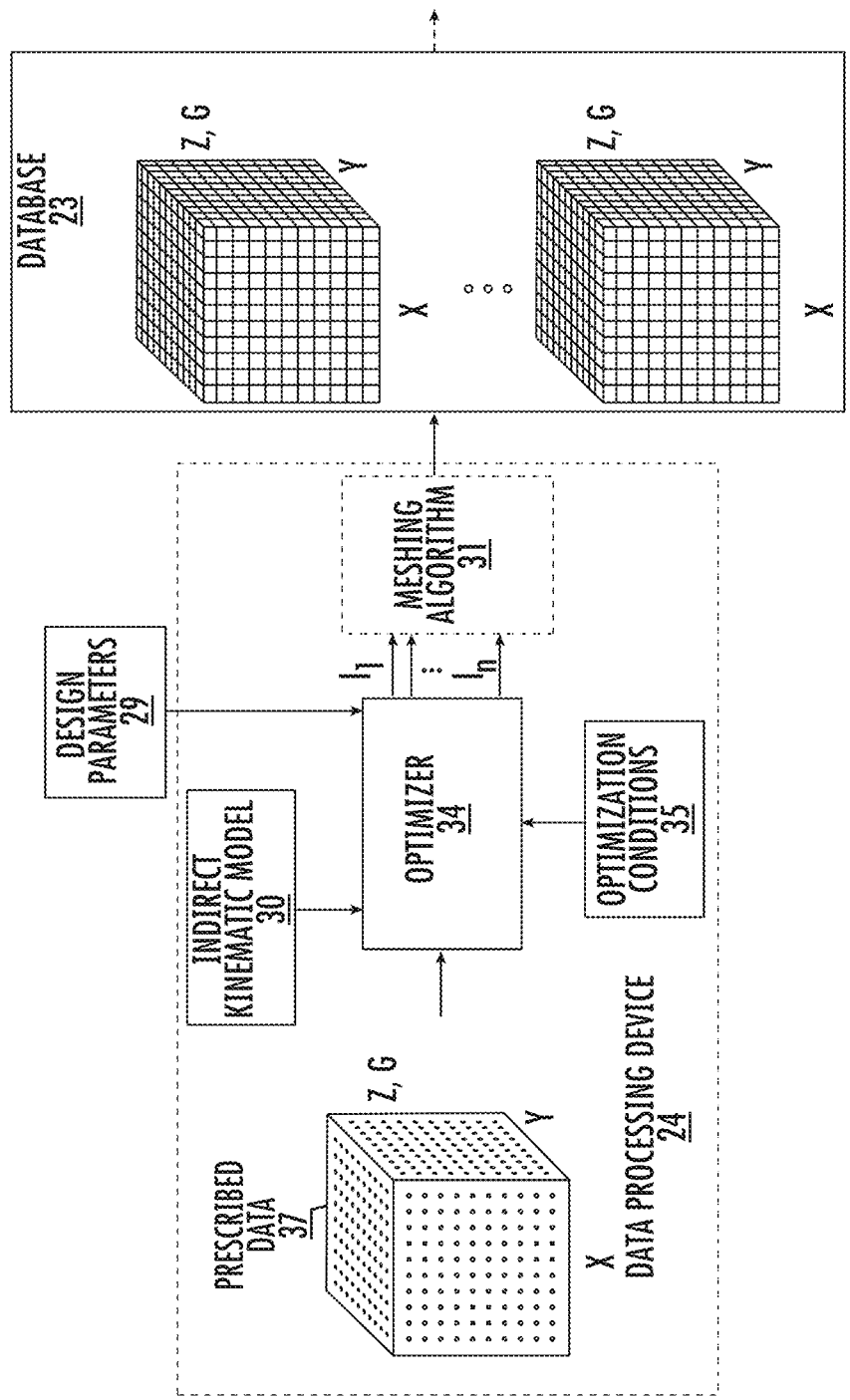
FIG. 7 is a symbolic representation of an optimization step for determining data sets for a database of the control device.

FIG. 7 illustrates the operation of a data processing step of the method in detail. The predefined target coordinates of the predefined target points and the predefined load values are together depicted diagrammatically as prescribed data 37, stored in the data processing device 24, in the form of an adumbrated four-dimensional cube with coordinates X, Y, Z and G. The granularity, that is to say the number, of the possible target coordinates, and the granularity or step size of the predefined load values between a minimum and a maximum value, can be prescribed according to the field of use of the load transport device 1, as has been mentioned at the beginning.

In the data processing step, the coordinates X, Y, Z of the predefined target coordinates and the load values G of the prescribed data 37 are further supplied to the optimizer 34. Solutions for the precalculated desired cable lengths of the positioning cables 6a-d and of the hoist cable 10 that are valid for the prescribed data 37 are then determined by the optimizer 34 by means of the indirect kinematic model 30, which in the exemplary embodiment is in particular extended by the consideration of the specific cable weight. These precalculated desired cable lengths of the positioning cables 6a-d and of the hoist cable 10 are depicted generally in FIG. 7 as L1 . . . Ln. The valid solutions for the precalculated desired cable lengths of the positioning cables 6a-d and of the hoist cable 10 as well as for the respective associated load value and the associated target coordinates are further stored by the data processing device 24 in the database 23 of the control device 20 as data sets. The dotted line with an arrowhead connecting to the database 23 in FIG. 7 indicates the link with the interpolator 32, which can be seen in FIG. 6.

It is noted at this point that the symbolic representation of the data sets in the database 23 and of the prescribed data 37 according to FIG. 7 are highly simplified representations, because four-dimensional tables or relationships can only be represented in a highly simplified manner. A respective cube of the database 23 therefore represents only symbolically the values of a respective one of the positioning cables 6a-d. The three dots depicted in FIG. 7 therefore indicate the large quantity of corresponding four-dimensional data.

In the exemplary embodiment, a meshing algorithm 31 is stored in the data processing device 24, which algorithm meshes the predefined target coordinates to form a computational mesh, for example a polygon mesh, in particular a tetrahedral mesh, as computational mesh data. The computational mesh data comprise link data linking adjacent predefined target positions of the load pick-up apparatus 5 and predefined load values of the load 3. In the exemplary embodiment, these computational mesh data are also stored in the database 23 of the control device 20, but this is not shown separately. The computational mesh data are taken into consideration by the control device 20 in the determination of the desired cable length to be set for the respective positioning cable 6a-d and for the hoist cable 10. In particular when an interpolator 32 is used, the computational mesh data can be used to quickly find closest matching data sets.

In the exemplary embodiment, the meshing algorithm 31 is a Delaunay triangulation, which uses tetrahedral meshes. In a modified form, a meshing algorithm 31 could be dispensed with, and for this reason it is represented in the figures by broken lines.

In the exemplary embodiment, it is provided that an iteration algorithm (not shown explicitly) is stored in the data processing device 24. The iteration algorithm serves to refine the computational mesh in edge regions of the workspace 2, wherein precalculated desired cable lengths of the positioning cables 6a-d and in the exemplary embodiment also of the hoist cable 10 for additional coordinates of additional positions of the load pick-up apparatus 5 in the edge region of the workspace 2 are determined. By compressing the computational mesh in edge regions of the workspace 2, the workspace 2 can be enlarged, because additional valid solutions for the precalculated desired cable lengths are thus determined.

Figure 8:
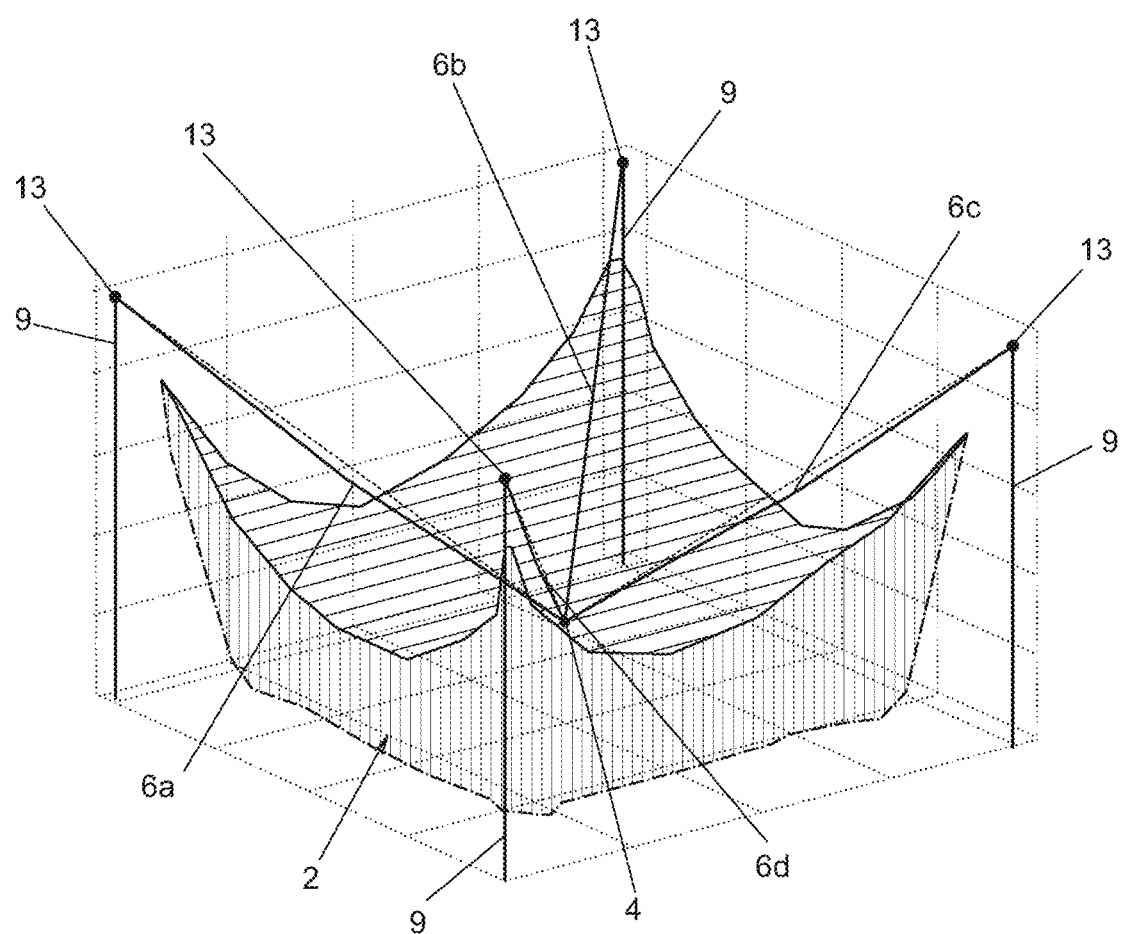
FIG. 8 is a simplified representation of a workspace determined by means of the data processing device with valid solutions for calculated desired cable lengths.

FIG. 8 shows the workspace 2 of the load transport device 1, which represents the predefined target points for which valid solutions for the desired cable lengths of the positioning cables 6a-d at the predefined load values have been determined by means of the optimizer. The individual predefined target points for which the valid solutions have been determined are not shown explicitly in FIG. 8. The data describing the workspace 2 can additionally be made available to the path planning software which has already been mentioned, in order to take into consideration in the path planning the regions to which the load transport device 1 is able to move.

FIG. 8 also shows that the positioning cables 6a-d, as a result of the consideration, already mentioned, of the specific cable weight in the indirect kinematic model 30, are subject to sagging, which is apparent by comparing the broken straight lines between the diverting sheaves 13 and the load carrier 4 with the actual course of the cables 6a-d in this figure.

Figure 9:
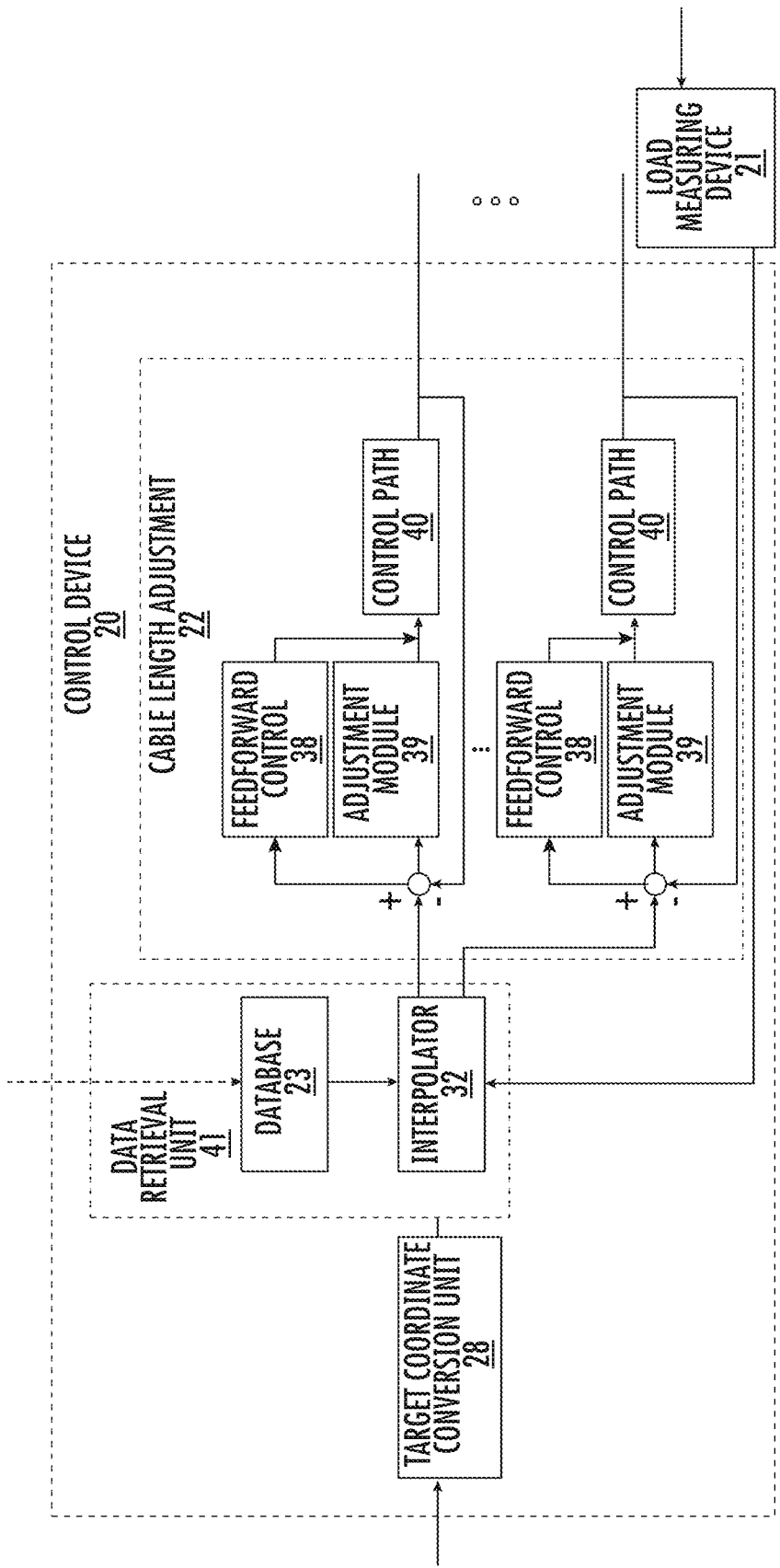
FIG. 9 is an alternative form of the control device according to FIG. 6 with feedforward control.

FIG. 9 shows a further modified form of the load transport device 1, in which a feedforward control 38 is provided in the cable length adjustment 22. By providing the feedforward control 38, the performance and stability of the cable length adjustment can be improved, which is well known in the field of control engineering. The control device 20 is otherwise identical to that shown in FIG. 6.

FIG. 10A to 10E show, in schematic form, a sequence of picking up a load 3 in order additionally to explain the functioning of the cable length adjustment 22 during operation of the load transport device 1. FIG. 10A to 10E show a highly simplified load transport device 1 in a two-dimensional representation, wherein only two positioning cables 6a and 6b and a hoist cable 10 are depicted. For the sake of simplicity, the hoist cable 10 is depicted only between the load carrier 4 and the load pick-up apparatus 5.

Figure 10A:
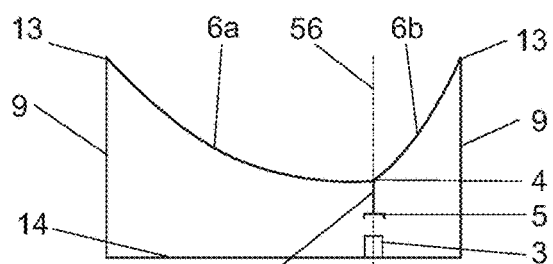
FIG. 10A to 10E are representations of a sequence, simplified to a two-dimensional view, of picking up a load from the ground by means of the load pick-up apparatus using the method according to the invention in five steps a to e.
Figure 10B:
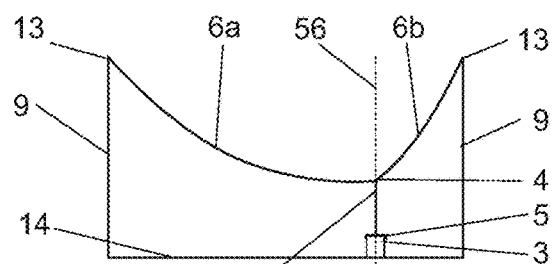
Figure 10C:
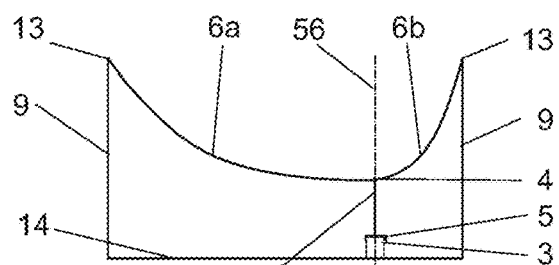
Figure 10D:
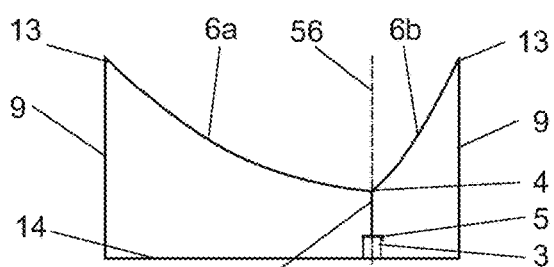
Figure 10E:
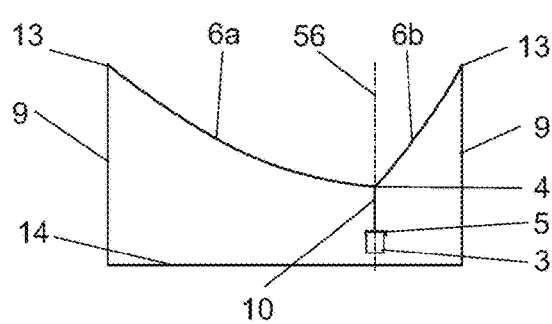
Figure 11:
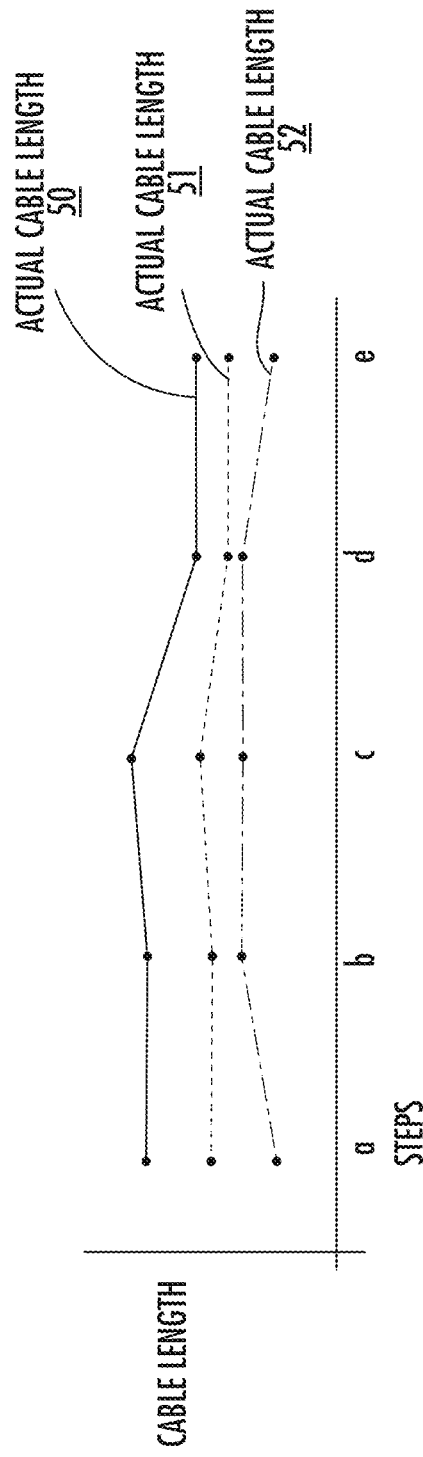
FIG. 11 is a diagram of the profile of the actual cable lengths of the positioning cables in the five steps a to e according to FIG. 10A to 10E.

FIG. 11 shows a schematic diagram of the profile of the actual cable lengths of the positioning cables 6a and 6b and that of the actual cable length of the hoist cable 10 in the five steps a to e according to the steps shown in FIG. 10A to 10E. The actual cable length 50 of the positioning cable 6a is represented by a solid line and the actual cable length 51 of the positioning cable 6b is represented by a broken line. The actual cable length 52 of the hoist cable 10 is depicted by a dot-and-dash line. The lines between points a to e serve merely to improve the readability of the different actual cable lengths.

Figure 12:
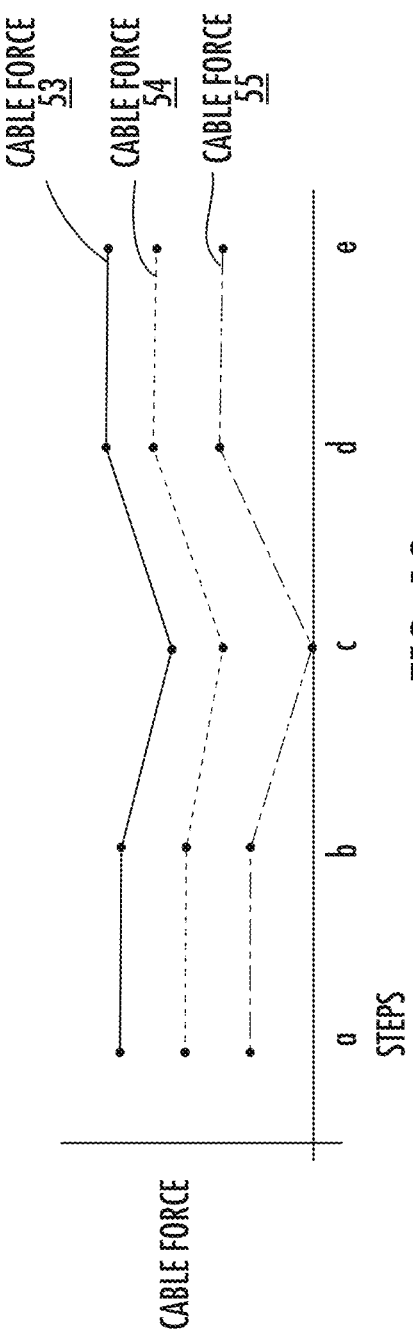
FIG. 12 is a diagram of the profile of the cable forces in the positioning cables in the five steps a to e according to FIG. 10A to 10E.

FIG. 12 shows a diagram of the profile of the cable forces in the positioning cables 6a and 6b and in the hoist cable 10 in the five steps a to e according to FIG. 10A to 10E. The cable force 53 of the positioning cable 6a is depicted by solid lines, the cable force 54 of the positioning cable 6b by broken lines and the cable force 55 by dot-and-dash lines. Here too, the lines between points a to e serve merely to improve the readability of the different cable forces.

FIG. 10A shows a situation in which the load pick-up apparatus 5 is located above the load 3. That is to say, the load pick-up apparatus 5 and the load carrier 4 are located vertically above the load 3, as illustrated by the vertical line 56 which is depicted.

In FIG. 10B, the actual cable length 52 of the hoist cable 10 is lengthened compared to FIG. 10A, so that the load pick-up apparatus 5 is located just above the load 3. The position of the load carrier 4 is unchanged compared to FIG. 10A, that is to say the actual cable lengths 50, 51 are unchanged compared to FIG. 10A, see point b in FIG. 11. The cable forces 53, 54, 55 remain substantially constant, see point b in FIG. 12.

In the situation shown in FIG. 10C, the load carrier 4 has been set down on the load 3, so that the positioning cables 6a, 6b sag slightly more compared to FIGS. 10A and 10B and the hoist cable 10 is relaxed, see the cable forces in FIG. 12 at point c. In order that the load carrier 4 remains in the vertical direction above the load pick-up apparatus 5, the actual cable lengths of the positioning cables 6a, 6b are lengthened slightly compared to point b, see also FIG. 11.

FIG. 10D shows a situation in which the load 3 has just been lifted from the ground 14. It is apparent that the positioning cables 6a and 6b are highly tensioned and the actual cable lengths 50, 51 are shortened compared to FIG. 10C, while the hoist cable 10 still has the same length as shown in FIG. 10c, see also FIG. 11. That is to say, it is provided that, until the load 3 is actually lifted from the ground 14, the cable length adjustment 22 takes place only by changing the actual cable lengths 50, 51 of the positioning cables 6a, 6b. In other words, during the process of lifting a load 3 that is still on the ground 14 by tightening the positioning cables 6a, 6b, an increase in the load measured value is measured by means of the load measuring device 21, so that new desired cable lengths to be set for the positioning cables 6a and 6b are determined by means of the interpolator 32 and the cable length adjustment 22 performs an adaptation of the actual cable lengths 50, 51 to the desired cable lengths to be set for the positioning cables 6a, 6b. The distance of the load pick-up apparatus 5 from the load carrier 4 in the vertical direction remains constant because the length of the hoist cable 10 does not change. It can thereby be ensured that the load carrier 4 is always located above the load 3 or the load pick-up apparatus 5 in the vertical direction until the load 3 is lifted. That is to say, tilting of the load 3 at the time the load 3 is actually lifted from the ground 14 can thereby be prevented.

In FIG. 10E, the load 3 has been lifted even further from the ground 14, wherein only the hoist cable 10 is shortened compared to the situation in FIG. 10D. The cable forces 53-55 remain substantially constant compared to the situation shown in FIG. 10D, see FIG. 12.

By measuring the weight of the load 3, it is possible with the cable length adjustment 22 to carry out a readjustment of the actual cable lengths of the positioning cables 6a-d and of the hoist cable 10 in dependence on the measured load. This is apparent in FIG. 10A to 10E in that the load carrier 4 and the load pick-up apparatus 5 and the load 3 always remain on the vertical line 56. If cable length adjustment 22 were not carried out in this manner, the load 3 would swing in the horizontal direction when the load 3 was lifted owing to the unsymmetrical distribution of the actual cable lengths of the positioning cables 6a, 6b.

In the method according to the invention, the readjustment of the actual cable length of the positioning cables 6a and 6b and of the hoist cable 10 can be carried out by retrieving new desired cable lengths of the positioning cables 6a, 6b and of the hoist cable 10 from the database 23 for the target point to be set, so that the load 3 is reliably lifted in the vertical direction. By means of the method according to the invention, it can be ensured in a simple manner that, as the load 3 is lifted from the ground 14, there is no swinging of the load 3 or of the load pick-up apparatus 5 relative to the load carrier 4. This is advantageous in particular also when transporting the load 3 over an uneven topography of the ground 14 or when traveling around obstacles, in order to prevent collisions.

Also when picking up bulk material by means of a load pick-up apparatus having a steel scoop bucket, it is possible, by continuously measuring the weight of the load, that is to say the quantity or mass of bulk material currently picked up, to react to changed load measured values by readjusting the actual cable lengths, in order, for example, to prevent undue sagging of one or more positioning cables when picking up bulk material. The same is also true when emptying or unloading the steel scoop bucket or other grab arranged on the load pick-up apparatus, for example a bulk material grab, in order, when the load measured at the load pick-up apparatus changes (as a result of the unloading of bulk material etc.), to prevent, by readjusting the actual cable lengths of the positioning cables, a horizontal displacement of the load carrier or of the load pick-up apparatus when partially or completely unloading the load.

The method according to the invention can also be used in a load transport device 1 in which the distance of the load pick-up apparatus 5 relative to the load carrier 4 is always constant, that is to say if, compared to the exemplary embodiment explained above, a hoist cable 10, and the associated possibility of a load pick-up apparatus 5 that can be lifted and lowered relative to the load carrier 4, is dispensed with. In other words, the load transport device 1 shown in FIG. 1 is then configured such that the load pick-up apparatus 5 in the form of a hook is suspended at a fixed distance from the load carrier 4. That is to say, all movements of the load carrier 4 and of the load pick-up apparatus 5 fastened thereto in the workspace 2 take place in this variant by means of a change of the actual cable lengths of the positioning cables 6a-d. As already mentioned, the load pick-up apparatus 5 could also be fastened directly to the load carrier 4.

Unlike in the representations in FIGS. 2 to 4, a hoist cable winch 11 can then be dispensed with, so that the cable length adjustment 22 of the hoist cable 10 indicated in FIG. 5 is also omitted. The remaining construction according to FIG. 5 with regard to the cable length adjustment 22 of the positioning cables 6a-6d is unchanged, wherein a precalculation of precalculated desired cable lengths of the hoist cable 10 is omitted. That is to say, the representations according to FIG. 6 to 9 apply also to the embodiment variant in which the distance of the load pick-up apparatus 5 from the load carrier 4 is constant and the cable length adjustment 22 is carried out analogously to the exemplary embodiment explained above solely in respect of the positioning cables 6a-d.

The process of lifting a load 3 from the ground 14 can follow from FIG. 10B to 10D even where the hoist cable 10 is omitted, because in the situations shown in those figures the hoist cable 10 has a constant length. The actual cable length 52 of the hoist cable 10 shown in FIG. 11 and the profile of the cable force 55 of the hoist cable 10 can thus be disregarded.

In FIG. 10B, the load pick-up apparatus 5 is arranged just above the load 3. The load carrier 4 is in the vertical direction above the load pick-up apparatus 5.

In the situation shown in FIG. 10C, the load carrier 4 has been set down on the load 3 by slackening of the positioning cables 6a, 6b, so that the positioning cables 6a, 6b sag slightly more compared to FIG. 10B, see the cable forces 53, 54 in FIG. 12 at point c.

FIG. 10D shows the situation in which the load 3 has just been lifted from the ground 14. It is apparent that the positioning cables 6a and 6b are highly tensioned and the actual cable lengths 50, 51 are shortened compared to FIG. 10C. During the process of lifting a load 3 that is still resting on the ground 14, an increase in the load measured value is measured by means of the load measuring device 21 as a result of a tightening of the positioning cables 6a, 6b, so that new desired cable lengths to be set for the positioning cables 6a and 6b are determined by means of the interpolator 32 and the cable length adjustment 22 performs an adaptation of the actual cable lengths 50, 51 to the desired cable lengths to be set for the positioning cables 6a, 6b. It can thereby be ensured that the load carrier 4 is always located above the load 3 or the load pick-up apparatus 5 in the vertical direction until the load 3 is lifted. That is to say, tilting of the load 3 at the time the load 3 is actually lifted from the ground 14 can thereby be prevented.

Further transport of the load 3 in the workspace 2 takes place in this embodiment variant, as mentioned, solely by way of actuation of the positioning cable winches 7.

LEGEND TO THE REFERENCE NUMERALS 1 load transport device
2 workspace
3 load
4 load carrier
5 load pick-up apparatus
6a positioning cable
6b positioning cable
6c positioning cable
6d positioning cable
7 positioning cable winch
8 positioning cable winch drive
9 suspension apparatus
10 hoist cable
11 hoist cable winch
12 hoist cable winch drive
13 diverting sheave
14 ground
20 control device
21 load measuring device
22 cable length adjustment
23 database
24 data processing device
25 absolute encoder
26 input device
27 path planning interface
28 target coordinate conversion unit
29 design parameters
30 indirect kinematic model
31 meshing algorithm
32 interpolator
33 frequency converter
34 optimizer
35 optimization conditions
37 prescribed data
38 feedforward control
39 adjustment module
40 control path
41 data retrieval unit
50 actual cable length
51 actual cable length
52 actual cable length
53 cable force
54 cable force
55 cable force
56 vertical line

The invention claimed is:

1. A method for controlling a movement of a load in a workspace of a load transport device using a control device of the load transport device, the load transport device comprising a load carrier and a load pick-up apparatus fastened to the load carrier for picking up the load, at least three positioning cables, and at least three suspension apparatuses arranged at a distance from one another, each said suspension apparatus has a positioning cable winch for winding and unwinding one of the positioning cables, and the load carrier is suspended from the suspension apparatuses by the positioning cables, the load carrier and the load pick-up apparatus being fastened thereto are displaceable at least one of in or over the workspace by actuation of the positioning cable winches, the method comprising the steps:
    acquiring target coordinates that are currently to be set of a target point in the workspace towards which the load pick-up apparatus is to be moved;
    determining a load measured value by measuring a weight of the load picked up at the load pick-up apparatus using a load measuring device of the load transport device;
    determining actual cable lengths of the positioning cables;
    determining desired cable lengths, which are to be set by the respective positioning cable winch by winding or unwinding, for the positioning cables for the target coordinates of the target point that are currently to be set and for the current load measured value;
    adapting the actual cable lengths of the respective positioning cables to the desired cable lengths to be set for the respective positioning cables, by actuating the respective positioning cable winch by a cable length adjustment of the control device and winding or unwinding the respective positioning cables; and
    wherein the control device has a database in which a large number of data sets are stored, each said data set storing a precalculated desired cable length for in each case one of the positioning cables for predefined target coordinates of a predefined target point and for a predefined load value, and the desired cable lengths to be set for the positioning cables by the respective positioning cable winch are determined by the control device by querying the database, and for each of the positioning cables, the control device searching the database for at least one data set that matches the target coordinates of the target point that are currently to be set and the current load measured value, and the desired cable length to be set for the respective positioning cable is determined based on the precalculated desired cable length of the at least one data set that matches.

2. The method as claimed in claim 1, further comprising calculating the target coordinates that are currently to be set using a target coordinate conversion unit of the control device from a prescribed velocity vector outputted by a movement prescribing device of the load transport device.

3. The method as claimed in claim 1, wherein for each of the positioning cables, the control device searches the database for at least two of the data sets that are closest to the target coordinates of the target point that are currently to be set and to the current load measured value, and the desired cable length to be set for the respective positioning cable is determined based by interpolating the precalculated desired cable lengths of the at least two closest data sets.

4. The method as claimed in claim 1, wherein the cable length adjustment comprises feedforward control of the desired cable length to be set for the positioning cables.

5. The method as claimed in claim 1, further comprising carrying out the precalculation of the precalculated desired cable lengths of the positioning cables in a data processing step of the method in a data processor, separate from the control device, of the load transport device, including storing an indirect kinematic model of the load transport device and an optimizer in the data processor, supplying the indirect kinematic model and the predefined load values as well as the predefined target coordinates of the predefined target points to the optimizer, and determining solutions for the desired cable lengths of the positioning cables that are valid for the predefined load values at the predefined target coordinates by the optimizer using the indirect kinematic model, and storing the valid solutions as the precalculated desired cable lengths of the positioning cables, together with the respective associated load value and the respective associated predefined target coordinates, by the data processor in the database of the control device as one of the data sets.

6. The method as claimed in claim 5, further comprising, in the data processing step, taking into consideration a specific cable weight of the respective positioning cable in the precalculation of the precalculated desired cable lengths of the positioning cables in the indirect kinematic model.

7. The method as claimed in claim 5, wherein the data processing step is based on at least one optimizing condition from:
   smallest sag of the positioning cables;
   smallest cable force of the positioning cables;
   smallest sum of cable forces of the positioning cables;
   highest allowable cable force of the respective positioning cable;
   smallest difference between cable forces of the positioning cables; or elastic deformation of the suspension apparatuses.

8. The method as claimed in claim 5, further comprising, in the data processing step, applying a meshing algorithm, which meshes the predefined target coordinates to form a computational mesh as computational mesh data, the computational mesh data comprise link data for linking adjacent predefined target coordinates of the predefined target point of the load pick-up apparatus and adjacent predefined load values, storing the computational mesh data in the database of the control device, and taking the computational mesh data into consideration by the control device in the determination of the desired cable length to be set for the respective positioning cable.

9. The method as claimed in claim 8, wherein the data processing step comprises an iteration for compressing the computational mesh in at least one edge region of the workspace, and desired cable lengths of the positioning cables for additional coordinates of additional positions of the load pick-up apparatus are determined in the at least one edge region.

10. The method as claimed in claim 5, further comprising:
   acquiring design parameters for calculating the precalculated desired cable lengths of the positioning cables in the data processing step, wherein the design parameters include at least one of the following characteristic values:
   a position of cable run-off points of the suspension apparatuses, at which the respective positioning cable runs from the respective suspension apparatus in a direction towards the load carrier;
   positions of the positioning cable winches;
   specific cable elongation of the respective positioning cable;
   stiffness of the respective suspension apparatus;
   a weight of the load carrier;
   a weight of the load pick-up apparatus; or
   a center of mass of at least one of the load carrier or of the load pick-up apparatus.

* * * * *